US012638708B2

(12) United States Patent
Hase et al.

(10) Patent No.: US 12,638,708 B2
(45) Date of Patent: May 26, 2026

(54) METHOD FOR MANUFACTURING DISPLAY DEVICE

(71) Applicant: Japan Display Inc., Tokyo (JP)

(72) Inventors: Kasumi Hase, Tokyo (JP); Koichi Igeta, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 15 days.

(21) Appl. No.: 18/670,122

(22) Filed: May 21, 2024

(65) Prior Publication Data

US 2024/0393634 A1 Nov. 28, 2024

(30) Foreign Application Priority Data

May 24, 2023 (JP) ................................ 2023-085547

(51) Int. Cl.
*G02F 1/1334* (2006.01)
*G02F 1/1339* (2006.01)
*G02F 1/1343* (2006.01)

(52) U.S. Cl.
CPC ........ *G02F 1/13345* (2021.01); *G02F 1/1339* (2013.01); *G02F 1/13439* (2013.01)

(58) Field of Classification Search
CPC . G02F 1/13345; G02F 1/1339; G02F 1/13439
See application file for complete search history.

(56) References Cited

U.S. PATENT DOCUMENTS

| | | | | |
|---|---|---|---|---|
| 7,016,001 B2 * | 3/2006 | Tanaka | G02F 1/1393 | 349/138 |
| 2008/0316406 A1 * | 12/2008 | Inoue | G02F 1/1368 | 349/123 |
| 2018/0031758 A1 | 2/2018 | Mizuno et al. | | |
| 2020/0150490 A1 | 5/2020 | Mizuno et al. | | |
| 2021/0116759 A1 | 4/2021 | Mizuno et al. | | |
| 2022/0011639 A1 * | 1/2022 | Ohue | G02F 1/1334 | |
| 2022/0113593 A1 | 4/2022 | Mizuno et al. | | |
| 2022/0147174 A1 * | 5/2022 | Ikeda | G02F 1/1334 | |
| 2023/0152631 A1 | 5/2023 | Mizuno et al. | | |

FOREIGN PATENT DOCUMENTS

JP 2018-021974 A 2/2018

* cited by examiner

*Primary Examiner* — David Y Chung
(74) *Attorney, Agent, or Firm* — K&L Gates LLP

(57) ABSTRACT

According to an aspect, a method for manufacturing a display device includes: producing an array substrate in which first electrodes are formed on a first light-transmitting base member; producing a counter substrate in which a second electrode is formed on a second light-transmitting base member; forming a sealing portion on the array substrate or the counter substrate; dropping, inside the sealing portion, polymer-dispersed liquid crystals that contain photocrosslinkable monomers and liquid crystal molecules in gaps between the monomers; bonding the array substrate to the counter substrate, and forming a liquid crystal layer in which the polymer-dispersed liquid crystals have been dropped; and curing the liquid crystal layer by irradiating the liquid crystal layer with ultraviolet rays while a voltage is applied to the first and second electrodes. At the producing the counter substrate, projections of the second electrode that project from the second electrode toward the first electrodes are formed.

2 Claims, 25 Drawing Sheets

METHOD FOR MANUFACTURING DISPLAY DEVICE

CROSS-REFERENCE TO RELATED APPLICATION

This application claims the benefit of priority from Japanese Patent Application No. 2023-085547 filed on May 24, 2023, the entire contents of which are incorporated herein by reference.

BACKGROUND

1. Technical Field

What is disclosed herein relates to a method for manufacturing a display device.

2. Description of the Related Art

Japanese Patent Application Laid-open Publication No. 2018-021974 (JP-A-2018-021974) describes a display device that includes a first light-transmitting substrate, a second light-transmitting substrate disposed so as to face the first light-transmitting substrate, a liquid crystal layer including polymer-dispersed liquid crystals filled between the first and the second light-transmitting substrates, and at least one light emitter disposed so as to face at least one of side surfaces of the first and the second light-transmitting substrates.

In the display device described in JP-A-2018-021974, a polymer network is formed by polymerizing monomers, and this polymer network is mixed with liquid crystal molecules in the liquid crystal layer.

The liquid crystal molecules near an orientation film may behave differently from those in a central portion of the liquid crystal layer. Specifically, the initial orientation of the liquid crystal molecules in the central portion of the liquid crystal layer varies. Therefore, when a voltage is applied to pixel electrodes, the liquid crystal molecules may be driven in random directions. As a result, scattering characteristics of the liquid crystal molecules that depend on the applied voltage may vary pixel by pixel. The pixel-by-pixel variation in the scattering characteristics of the liquid crystal molecules depending on the applied voltage may cause unintended deterioration in display quality.

For the foregoing reasons, there is a need for a method for manufacturing a display device that improves the display quality.

SUMMARY

According to an aspect, a method for manufacturing a display device includes: producing an array substrate in which a plurality of first electrodes are formed on a first light-transmitting base member; producing a counter substrate in which a second electrode is formed on a second light-transmitting base member facing the first light-transmitting base member; forming a sealing portion on one of the array substrate and the counter substrate; dropping, inside the sealing portion, polymer-dispersed liquid crystals that contain photocrosslinkable monomers and liquid crystal molecules in gaps between the monomers; bonding the array substrate to the counter substrate, and forming a liquid crystal layer in which the polymer-dispersed liquid crystals have been dropped; and curing the liquid crystal layer by irradiating the liquid crystal layer with ultraviolet rays while a voltage is applied to the first electrodes and the second electrode so as to produce a potential difference between the first electrodes and the second electrode. At the producing the counter substrate, projections of the second electrode that project from the second electrode toward the first electrodes are formed.

According to an aspect, a method for manufacturing a display device includes: producing an array substrate in which a plurality of first electrodes are formed on a first light-transmitting base member; producing a counter substrate in which a plurality of second electrodes are formed on a second light-transmitting base member facing the first light-transmitting base member; forming a sealing portion on one of the array substrate and the counter substrate; dropping, inside the sealing portion, polymer-dispersed liquid crystals that contain photocrosslinkable monomers and liquid crystal molecules in gaps between the monomers; bonding the array substrate to the counter substrate, and forming a liquid crystal layer in which the polymer-dispersed liquid crystals have been dropped; and curing the liquid crystal layer by irradiating the liquid crystal layer with ultraviolet rays while a voltage is applied to the first electrodes and the second electrodes so as to produce a potential difference between the first electrodes and the second electrodes. At the producing the counter substrate, a plurality of slits for each pixel are formed between the second electrodes along a second direction intersecting a first direction at predetermined intervals in the first direction in a plane parallel to a surface of the second light-transmitting base member.

DETAILED DESCRIPTION

Figure 1:
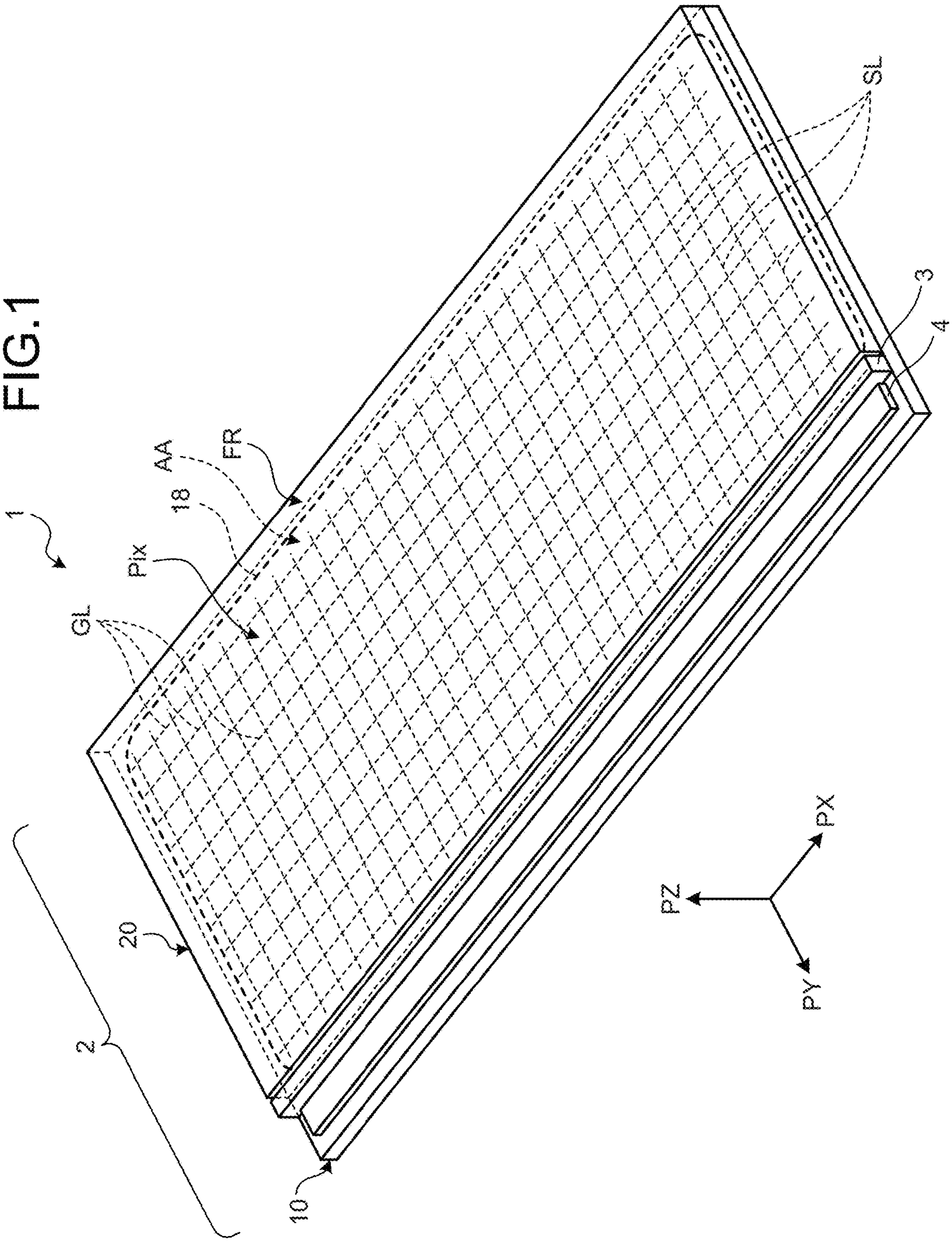
FIG. 1 is a perspective view illustrating an example of a display device according to an embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Display Device 1

Figure 2:
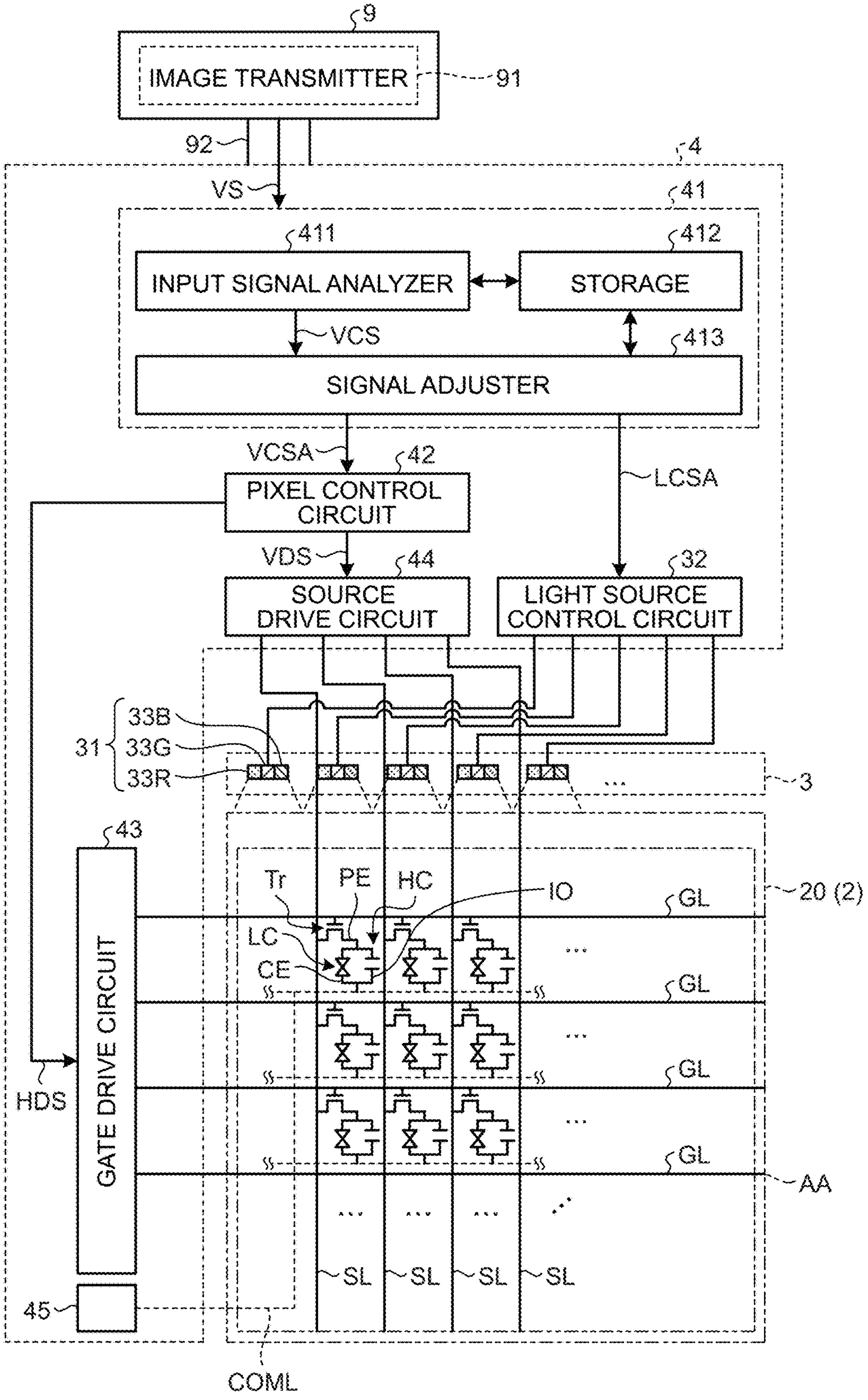
FIG. 2 is a block diagram illustrating the display device of a first embodiment of the present disclosure.
Figure 3:
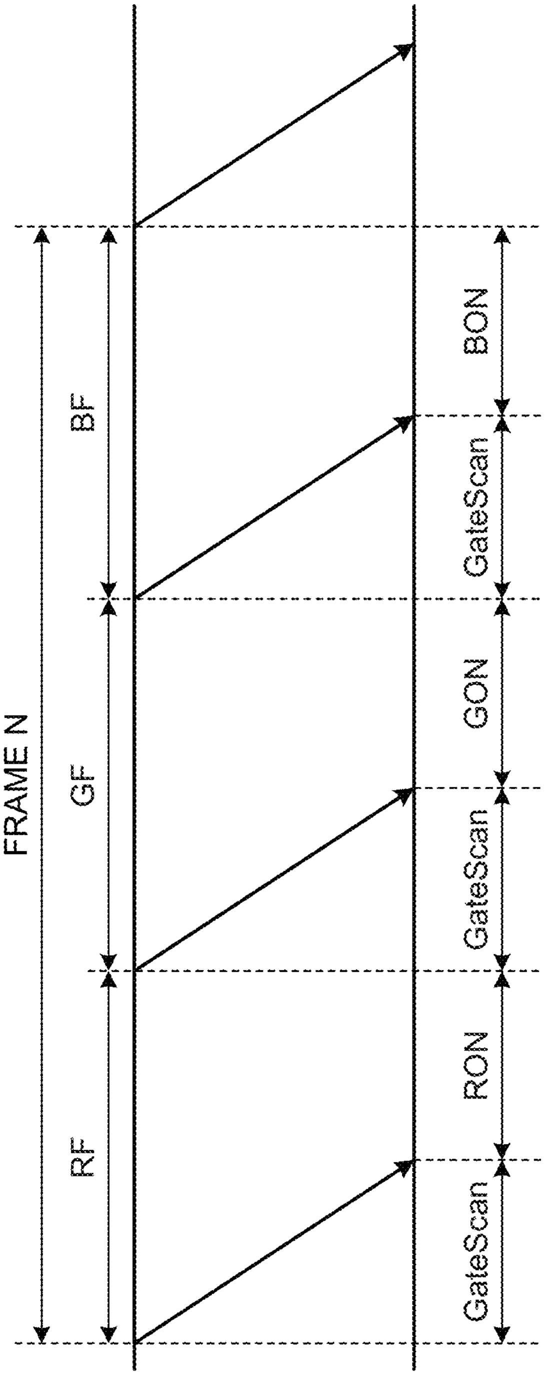
FIG. 3 is a timing diagram illustrating timing of light emission by a light source in a field-sequential system of the first embodiment.

FIG. 1 is a perspective view illustrating an example of a display device according to an embodiment of the present disclosure. FIG. 2 is a block diagram illustrating the display device of FIG. 1. FIG. 3 is a timing diagram illustrating timing of light emission by a light source in a field-sequential system.

As illustrated in FIG. 1, a display device 1 includes a display panel 2, a light source 3, and a drive circuit 4. A first direction PX denotes one direction in the plane of the display panel 2. A second direction PY denotes a direction orthogonal to the first direction PX. A third direction PZ denotes a direction orthogonal to the PX-PY plane.

Figure 5:
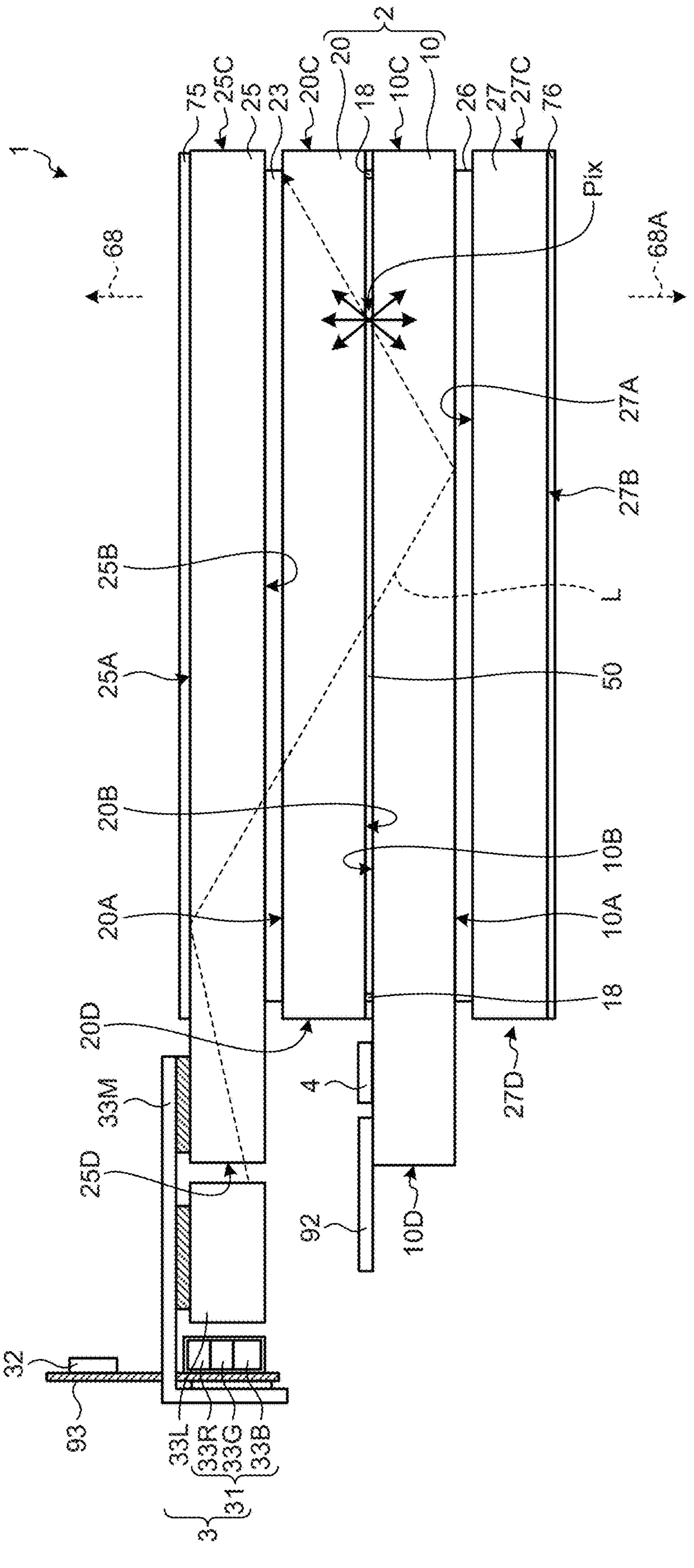
FIG. 5 is a sectional view illustrating an example of a section of the display device of FIG. 1.

The display panel 2 includes an array substrate 10, a counter substrate 20, and a liquid crystal layer 50 (refer to FIG. 5). The counter substrate 20 faces a surface of the array substrate 10 in a direction orthogonal thereto (in the direction PZ illustrated in FIG. 1). In the liquid crystal layer 50, polymer-dispersed liquid crystals LC are sealed by the array substrate 10, the counter substrate 20, and a sealing portion 18.

As illustrated in FIG. 1, the display panel 2 has a display region AA capable of displaying images and a peripheral region FR outside the display region AA. A plurality of pixels Pix are arranged in a matrix having a row-column configuration in the display region AA. In the present disclosure, a row refers to a pixel row including m pixels Pix arranged in one direction. In addition, a column refers to a pixel column including n pixels Pix arranged in a direction orthogonal to the direction in which the rows are arranged. The values of m and n are defined depending on a display resolution in the vertical direction and a display resolution in the horizontal direction. A plurality of scan lines GL are provided corresponding to the rows, and a plurality of signal lines SL are provided corresponding to the columns.

The light source 3 includes a plurality of light emitters 31. As illustrated in FIG. 2, a light source controller (light source control circuit) 32 is included in the drive circuit 4. The light source controller 32 may be a circuit separate from the drive circuit 4. The light emitters 31 are electrically coupled to the light source controller 32 through wiring in the array substrate 10.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area in the PX-PY plane that is larger than that of the counter substrate 20, and the drive circuit 4 is provided on a projecting portion of the array substrate 10 exposed from the counter substrate 20.

The signal processing circuit 41 receives a first input signal (such as a red-green-blue (RGB) signal) VS from an image transmitter 91 of an external higher-level controller 9 through a flexible substrate 92.

The signal processing circuit 41 includes an input signal analyzer 411, a storage 412, and a signal adjuster 413. The input signal analyzer 411 generates a second input signal VCS based on the externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42 and transmits a light source control signal LCSA to the light source controller 32. The light source control signal LCSA is a signal including information on light quantities of the light emitters 31 set according to, for example, input gradation values to be given to the pixels Pix. For example, the light quantities of the light emitters 31 are set smaller when a darker image is to be displayed. When a brighter image is to be displayed, the light quantities of the light emitters 31 are set larger.

The pixel control circuit 42 then generates a horizontal drive signal HDS and a vertical drive signal VDS based on the third input signal VCSA. In the present embodiment, since the display device 1 is driven based on the field-sequential system, the horizontal drive signal HDS and the vertical drive signal VDS are generated for each color emittable by the light emitters 31.

The gate drive circuit 43 sequentially selects the scan lines GL of the display panel 2 based on the horizontal drive signal HDS within one vertical scan period. The scan lines GL can be selected in any order.

The source drive circuit 44 supplies gradation signals corresponding to output gradation values of the pixels Pix to the signal lines SL of the display panel 2 based on the vertical drive signal VDS within one horizontal scan period.

In the present embodiment, the display panel 2 is an active matrix panel. Therefore, the display panel 2 includes the signal (source) lines SL extending in the second direction PY and the scan (gate) lines GL extending in the first direction PX in plan view, and includes switching elements Tr at intersections between the signal lines SL and the scan lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to the signal line SL. The gate electrode of the switching element Tr is coupled to the scan line GL. The other of the source electrode and the drain electrode is coupled to one end of a capacitor of the polymer-dispersed liquid crystals LC. The capacitor of the polymer-dispersed liquid crystals LC is coupled at one end thereof to the switching element Tr through a pixel electrode PE, and coupled at the other end thereof to common potential wiring COML through a common electrode CE. Holding capacitance HC is generated between the pixel electrode PE and a holding capacitance electrode IO electrically coupled to the common potential wiring COML. The pixel electrode PE is a first electrode and the common electrode CE is a second electrode. A potential of the common potential wiring COML is supplied by the common potential drive circuit 45.

The light emitters 31 include a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scan period GateScan scatter light to perform display. On the entire display panel 2, if the gradation signals corresponding to the output gradation values of the respective pixels Pix are supplied to the above-described signal lines SL for the pixels Pix selected during the one vertical scan period GateScan, only the first color is lit up during the first color light emission period RON.

Then, in a second sub-frame (second predetermined time) GF, the light emitter 33G of the second color emits light during a second color light emission period GON, and the pixels Pix selected during the one vertical scan period GateScan scatter light to perform display. On the entire display panel 2, if the gradation signals corresponding to the output gradation values of the respective pixels Pix are supplied to the above-described signal lines SL for the pixels Pix selected during the one vertical scan period GateScan, only the second color is lit up during the second color light emission period GON.

Furthermore, in a third sub-frame (third predetermined time) BF, the light emitter 33B of the third color emits light during a third color light emission period BON, and the pixels Pix selected during the one vertical scan period GateScan scatter light to perform display. On the entire display panel 2, if the gradation signals corresponding to the output gradation values of the respective pixels Pix are supplied to the above-described signal lines SL for the pixels Pix selected during the one vertical scan period GateScan, only the third color is lit up during the third color light emission period BON.

Since a human eye has limited temporal resolving power, and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 4:
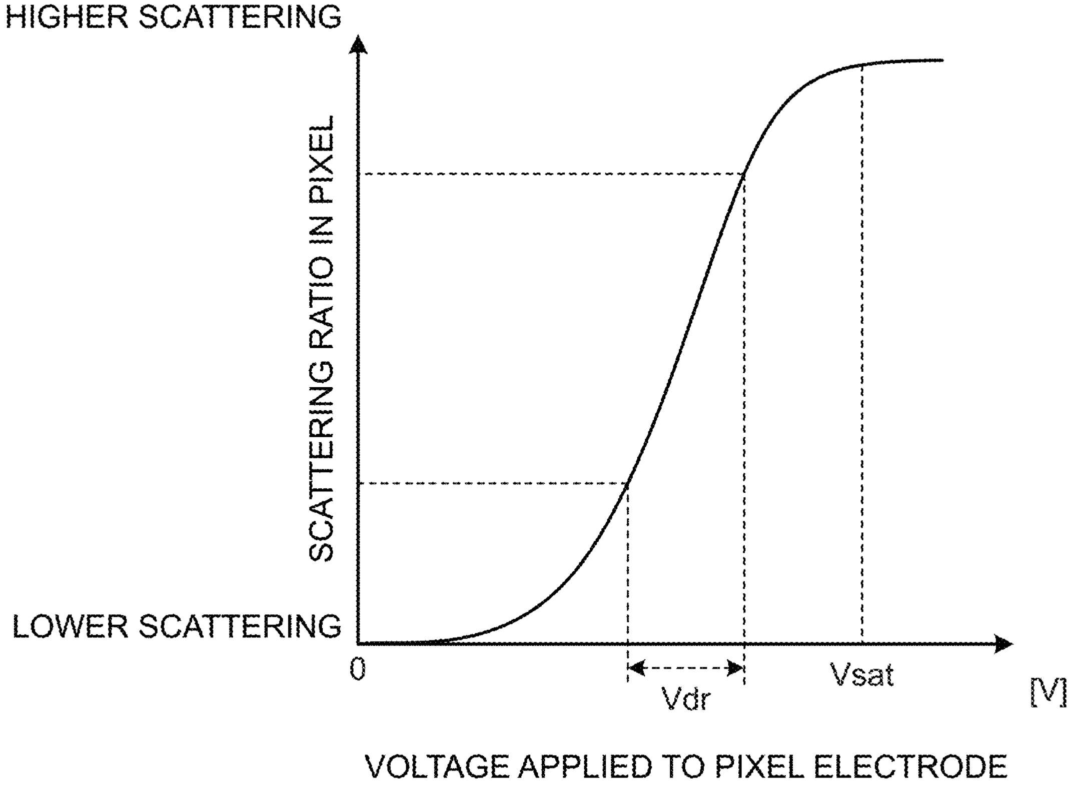
FIG. 4 is an explanatory diagram illustrating a relation between a voltage applied to a pixel electrode and a scattering state of a pixel.
Figure 6:
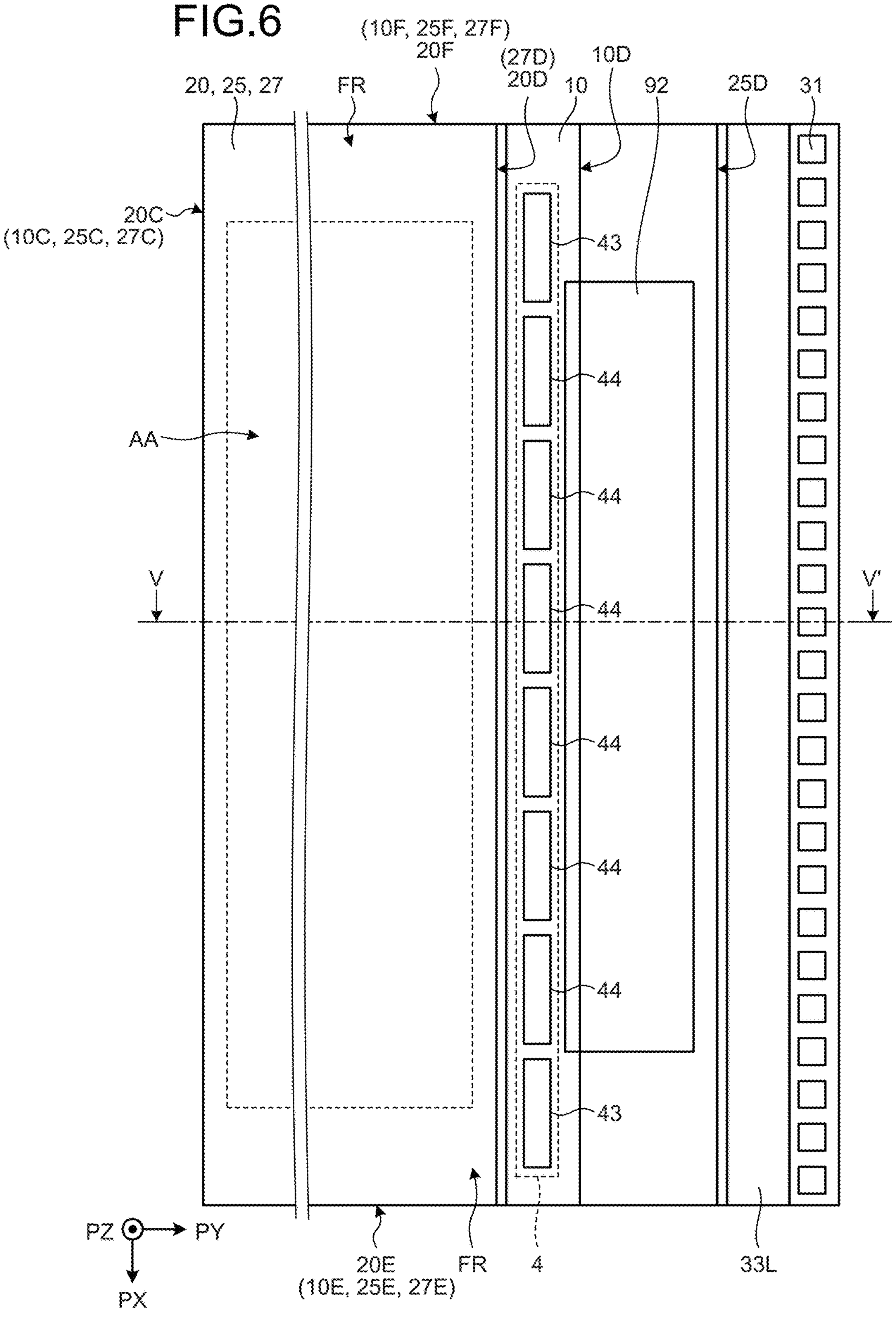
FIG. 6 is a plan view illustrating a planar surface of the display device of FIG. 1.

FIG. 4 is an explanatory diagram illustrating a relation between a voltage applied to the pixel electrode and a scattering state of the pixel. FIG. 5 is a sectional view illustrating an example of a section of the display device of FIG. 1. FIG. 6 is a plan view illustrating a planar surface of the display device of FIG. 1. FIG. 5 illustrates a section along V-V' of FIG. 6.

If the gradation signals corresponding to the output gradation values of the respective pixels Pix are supplied to the above-described signal lines SL for the pixels Pix selected during the one vertical scan period GateScan, a voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled according to the voltage applied to the pixel electrode PE, and the scattering ratio in the pixels Pix changes, as illustrated in FIG. 4.

As illustrated in FIG. 4, the change in the scattering ratio in the pixel Pix is smaller when the voltage applied to the pixel electrode PE is equal to or higher than a saturation voltage Vsat. Therefore, the drive circuit 4 changes the voltage applied to the pixel electrode PE according to the vertical drive signal VDS within a voltage range Vdr lower than the saturation voltage Vsat.

As illustrated in FIG. 5, the display device 1 includes a light-transmitting first base member 25, the display panel 2, and a light-transmitting second base member 27. A protective layer 75 is provided on one surface of the light-transmitting first base member 25. A protective layer 76 is provided on one surface of the light-transmitting second base member 27.

The display panel 2 includes the array substrate 10, the counter substrate 20, and the liquid crystal layer 50. The counter substrate 20 faces a surface of the array substrate 10 in a direction orthogonal thereto (in the direction PZ illustrated in FIG. 1). In the liquid crystal layer 50, the polymer-dispersed liquid crystals (to be described later) are sealed by the array substrate 10, the counter substrate 20, and the sealing portion 18.

As illustrated in FIGS. 5 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel flat surfaces. The first side surface 10C and the second side surface 10D are parallel flat surfaces. The third side surface 10E and the fourth side surface 10F are parallel flat surfaces.

As illustrated in FIGS. 5 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel flat surfaces. The first side surface 20C and the second side surface 20D are parallel flat surfaces. The third side surface 20E and the fourth side surface 20F are parallel flat surfaces.

As illustrated in FIGS. 5 and 6, the first base member 25 has a first principal surface 25A, a second principal surface 25B, a first side surface 25C, a second side surface 25D, a third side surface 25E, and a fourth side surface 25F. The first principal surface 25A and the second principal surface 25B are parallel flat surfaces. The first side surface 25C and the second side surface 25D are parallel flat surfaces. The third side surface 25E and the fourth side surface 25F are parallel flat surfaces.

The first base member 25 is bonded to the first principal surface 20A of the counter substrate 20 with an optical resin 23 interposed therebetween. The first base member 25 is a protective substrate for the counter substrate 20, and is formed, for example, of glass or a light-transmitting resin. When the first base member 25 is formed of a glass base material, it is also called a cover glass. When the first base member 25 is formed of a light-transmitting resin, it may be flexible. The same base material as the first base member 25 may be bonded to the first principal surface 10A of the array substrate 10 with an optical resin interposed therebetween.

As illustrated in FIGS. 5 and 6, the second base member 27 has a first principal surface 27A, a second principal surface 27B, a first side surface 27C, a second side surface 27D, a third side surface 27E, and a fourth side surface 27F. The first principal surface 27A and the second principal surface 27B are parallel flat surfaces. The first side surface 27C and the second side surface 27D are parallel flat surfaces. The third side surface 27E and the fourth side surface 27F are parallel flat surfaces.

The second base member 27 is bonded to the first principal surface 10A of the array substrate 10 with an optical resin 26 interposed therebetween. The second base member 27 is a protective substrate for the array substrate 10, and is formed of, for example, glass or a light-transmitting resin. When the second base member 27 is formed of a glass base material, it is also called a cover glass. When the second base member 27 is formed of a light-transmitting resin, it may be flexible.

As illustrated in FIGS. 5 and 6, the light source 3 faces the second side surface 25D of the first base member 25. The light source 3 may also be called a side light source. As illustrated in FIG. 5, the light source 3 emits light-source light to the second side surface 25D of the first base member 25. The second side surface 25D of the first base member 25 facing the light source 3 serves as a plane of light incidence. The plane of light incidence facing the light source 3 may be the second side surface 20D of the counter substrate 20 or the second side surface 27D of the second base member 27.

The light source 3 includes the light emitters 31 and a light guide 33L. The light emitters 31 include the light emitter 33R of the first color (such as red), the light emitter 33G of the second color (such as green), and the light emitter 33B of the third color (such as blue). The light guide 33L guides the light emitted by the light emitter 33R of the first color, the light emitter 33G of the second color, and the light emitter 33B of the third color to the second side surface 25D of the first base member 25. The light guide 33L simultaneously receives the light from the light emitters 31, internally diffuses the received light, and emits the diffused light to the display panel 2. As a result, the distribution of light per unit area irradiating the second side surface 25D of the first base member 25 is made uniform.

The light guide 33L is a single light guide 33L formed integrally from the third side surface 25E to the fourth side surface 25F. The light guide 33L may be formed by arranging a plurality of divided light guides from the third side surface 25E to the fourth side surface 25F. The light guide 33L may be formed by arranging the divided light guides from the third side surface 25E to the fourth side surface 25F and connecting the adjacent light guides to each other.

The light emitters 31 and the light guide 33L are fixed together with an adhesive material or the like, and assembled to a support 33M to form a light source module. The support 33M is mounted so as to overlap the first principal surface 25A of the first base member 25, and is fixed to the first base member 25 with an adhesive material or the like.

A wiring substrate 93 (flexible printed circuit board or printed circuit board (PCB) substrate) is provided with an integrated circuit of the light source controller 32, and the light source controller 32 is coupled to the light source 3 through the wiring substrate 93 (flexible printed circuit board or PCB substrate). The wiring substrate 93 is fixed to the support 33M with an adhesive material or the like.

As illustrated in FIG. 5, the light-source light L emitted from the light source 3 propagates in a direction (second direction PY) away from the second side surface 20D while being reflected by any of the first base member 25, the array substrate 10, the counter substrate 20, and the second base member 27.

As illustrated in FIG. 5, the light-source light L that has propagated in any of the first base member 25, the array substrate 10, the counter substrate 20, and the second base member 27 is scattered by the pixels Pix including the liquid crystals in the scattering state, and the angle of incidence of the scattered light becomes an angle smaller than the critical angle. Thus, emission light 68 and 68A is emitted outward from the first principal surface 20A of the counter substrate 20 (the first principal surface 25A of the first base member 25) and the first principal surface 10A of the array substrate 10, respectively. The emission light 68 and 68A emitted outward from the first principal surface 20A of the counter substrate 20 and the first principal surface 10A of the array substrate 10, respectively, is viewed by a viewer.

Therefore, as illustrated in FIG. 6, the light emitters 31 are arranged at a predetermined pitch in a region provided in the second direction PY with respect to the display region AA.

As illustrated in FIG. 6, the drive circuit 4 includes a plurality of integrated circuits of the gate drive circuit 43 and a plurality of integrated circuits of the source drive circuit 44.

Figure 7:
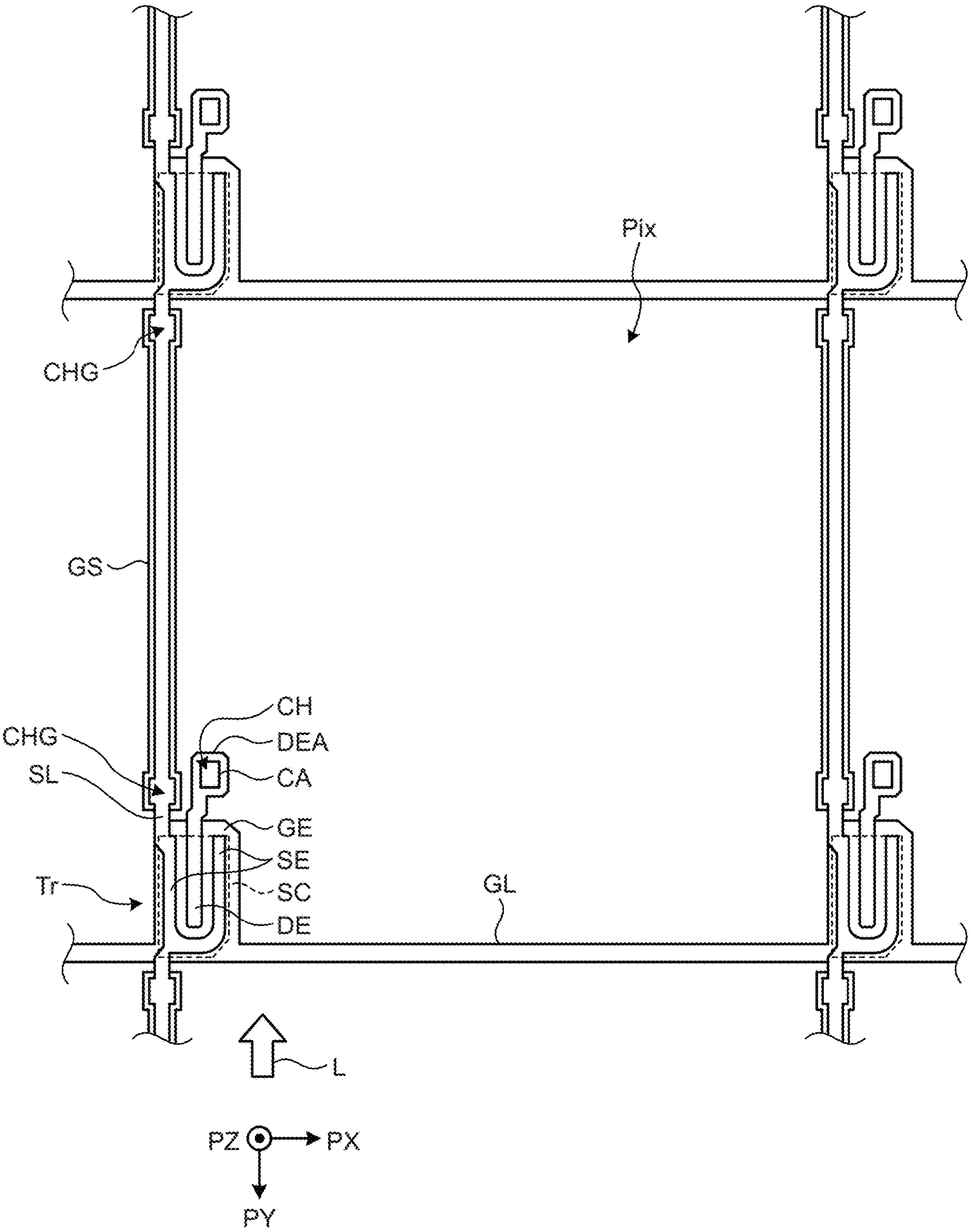
FIG. 7 is a plan view illustrating scan lines, signal lines, and a switching element in the pixel.
Figure 8:
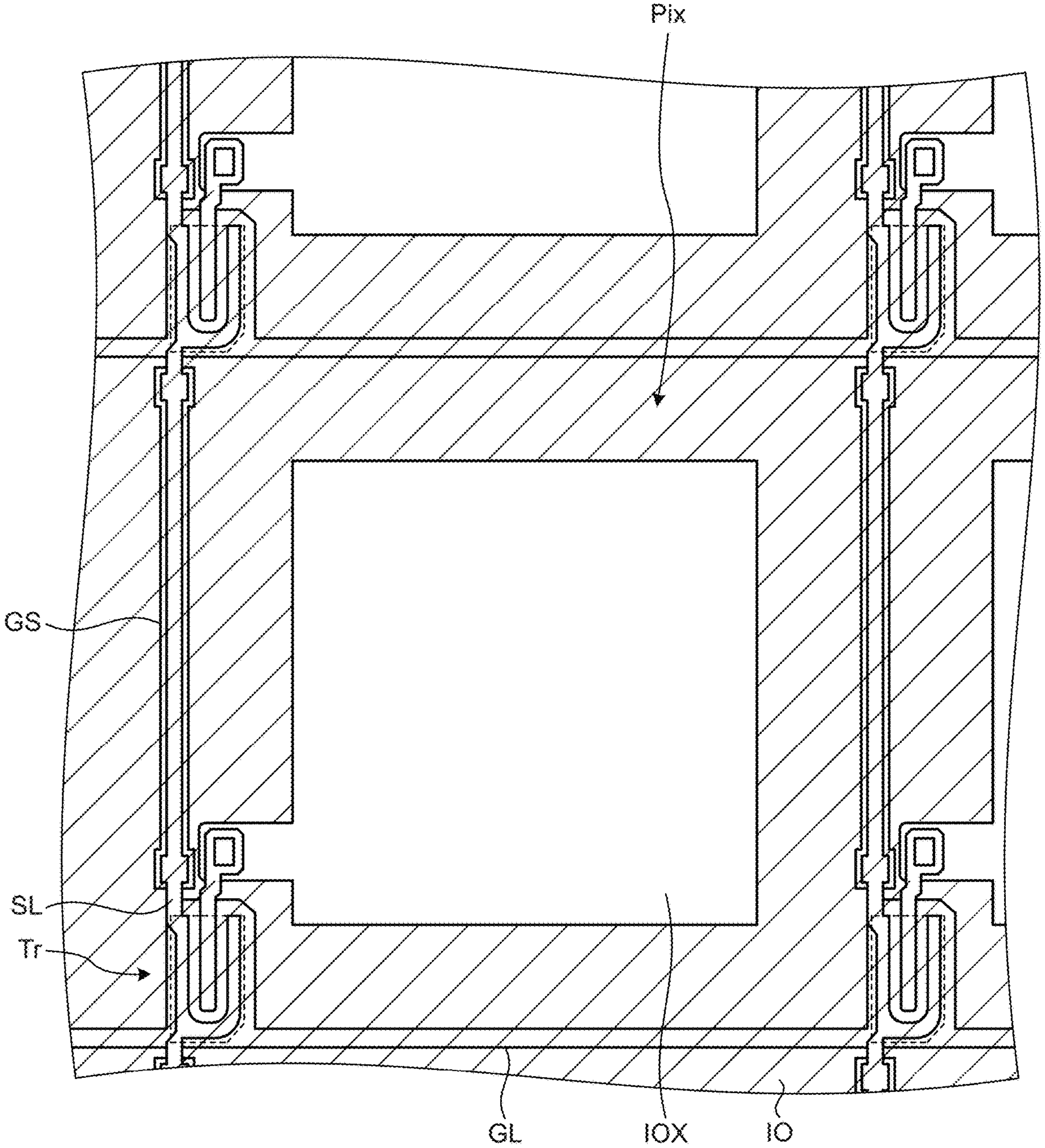
FIG. 8 is a plan view illustrating a holding capacitance layer in the pixel.
Figure 9:
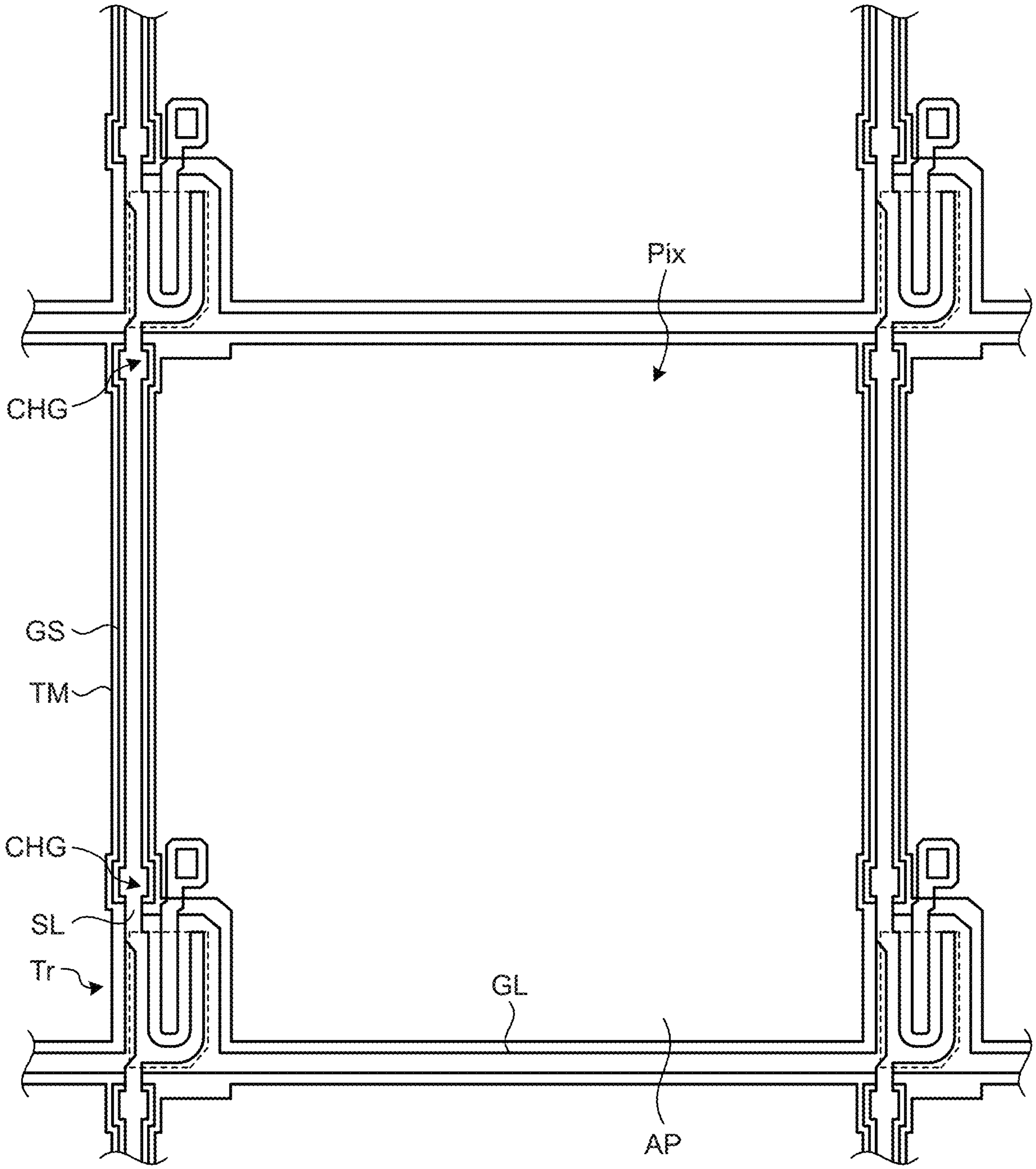
FIG. 9 is a plan view illustrating an auxiliary metal layer and an opening region in the pixel.
Figure 10:
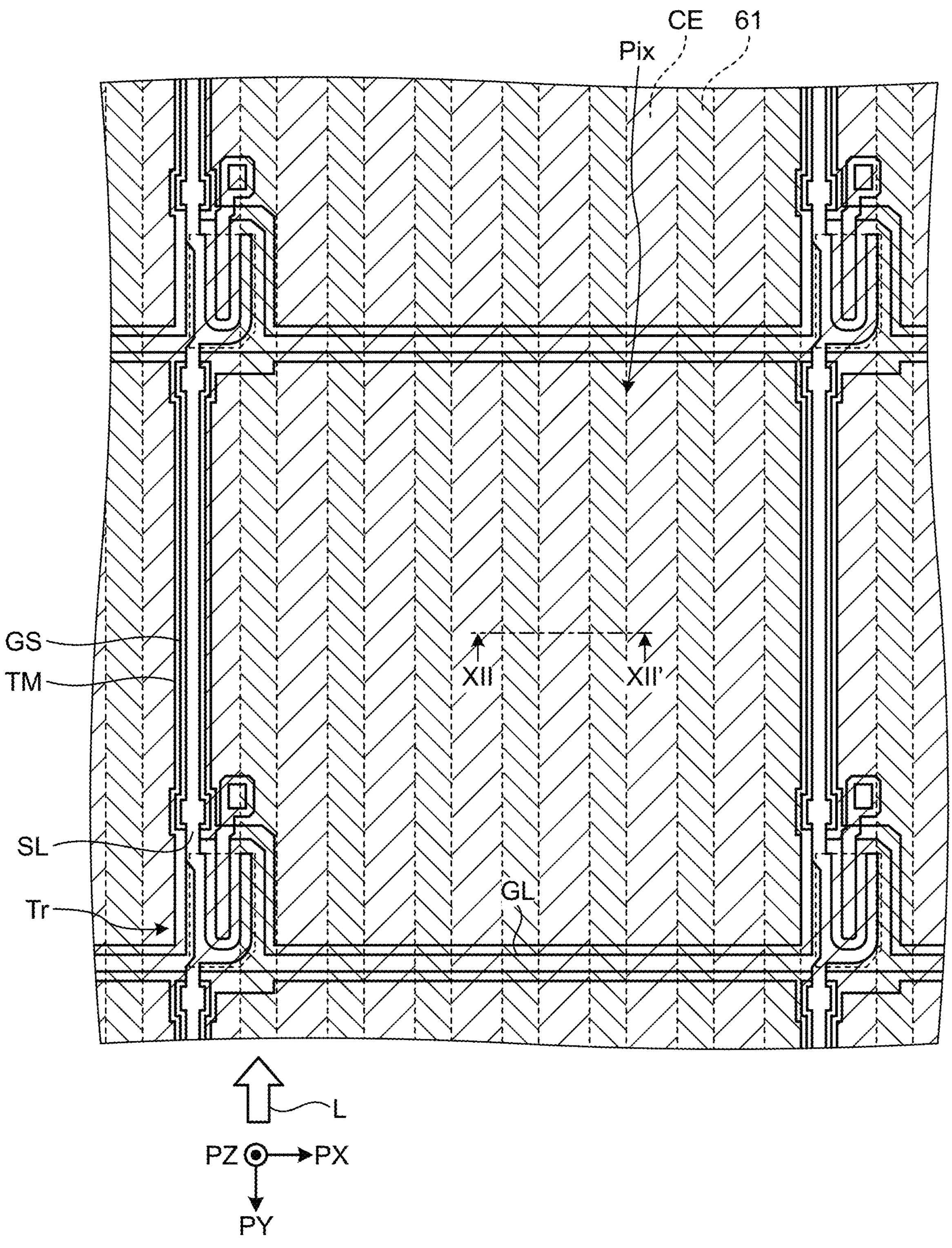
FIG. 10 is a plan view for describing a common electrode in the pixel.
Figure 11:
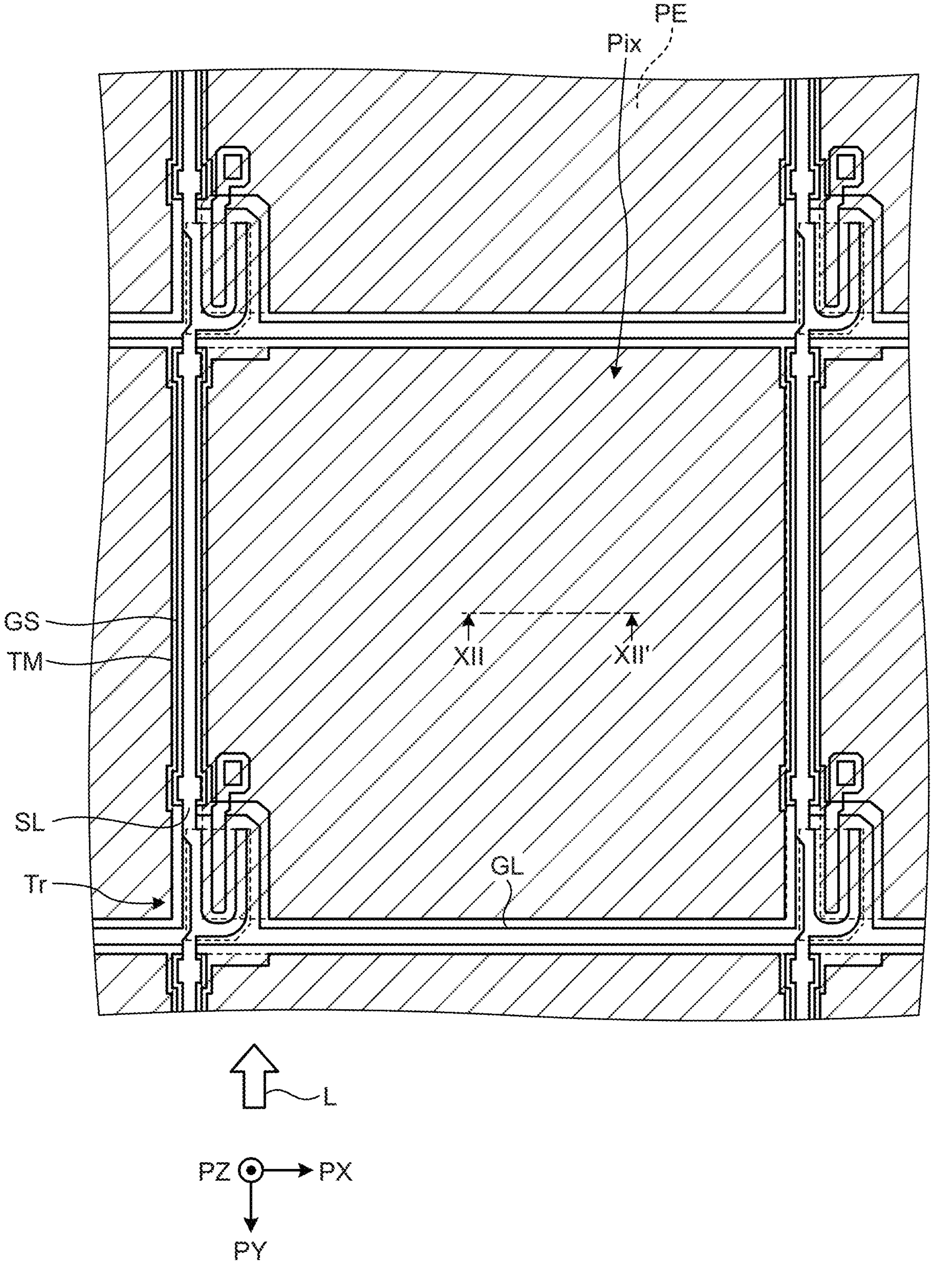
FIG. 11 is a plan view for describing the pixel electrode in the pixel.

FIG. 7 is a plan view illustrating the scan lines, the signal lines, and the switching element in the pixel. FIG. 8 is a plan view illustrating a holding capacitance layer in the pixel. FIG. 9 is a plan view illustrating an auxiliary metal layer and an opening region in the pixel. FIG. 10 is a plan view for describing the common electrode in the pixel. FIG. 11 is a plan view for describing the pixel electrode overlapping the common electrode illustrated in FIG. 10. As illustrated in FIGS. 1, 2, 10, and 11, the signal lines SL and the scan lines GL are provided in a grid pattern in plan view on the array substrate 10. In other words, one surface of the array substrate 10 is provided with the signal lines arranged at intervals in the first direction PX and the scan lines arranged at intervals in the second direction PY.

As illustrated in FIG. 7, a region surrounded by the adjacent scan lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in plan view, a gate electrode GE electrically coupled to a corresponding one of the scan lines GL.

As illustrated in FIG. 7, the scan lines GL are wiring of a metal such as molybdenum (Mo) or aluminum (Al), a multilayered body of these metals, or an alloy of these metals. The signal lines SL are wiring of a metal such as aluminum or an alloy thereof.

As illustrated in FIG. 7, the semiconductor layer SC is provided so as not to protrude from the gate electrode GE in plan view. As a result, the light-source light L traveling toward the semiconductor layer SC from the gate electrode GE side is reflected, and light leakage is less likely to occur in the semiconductor layer SC.

As illustrated in FIG. 5, the light-source light L emitted from the light source 3 is incident in the second direction PY serving as a direction of incidence. The direction of incidence refers to a direction from the second side surface 20D closest to the light source 3 toward the first side surface 20C that is a surface opposite to the second side surface 20D. When the direction of incidence of the light-source light L is the second direction PY, the length in the first direction PX of the semiconductor layer SC is smaller than the length in the second direction PY of the semiconductor layer SC. This configuration reduces the length in a direction intersecting the direction of incidence of the light-source light L, and thereby, reduces the effect of light leakage.

As illustrated in FIG. 7, two electrical conductors of a source electrode SE that are the same as the signal line SL extend from the signal line SL in the same layer as that of the signal line SL and in a direction intersecting the signal line. With this configuration, the source electrode SE electrically coupled to the signal line SL overlaps one end of the semiconductor layer SC in plan view.

As illustrated in FIG. 7, in plan view, a drain electrode DE is provided in a position between the adjacent electrical conductors of the source electrode SE. The drain electrode DE overlaps the semiconductor layer SC in plan view. A portion of the semiconductor layer SC overlapping neither the source electrode SE nor the drain electrode DE serves as a channel of the switching element Tr.

As illustrated in FIG. 8, the holding capacitance electrode IO has a region IOX including no light-transmitting conductive material in the region surrounded by the scan lines GL and the signal lines SL. The holding capacitance electrode IO is formed of a light-transmitting conductive material such as indium tin oxide (ITO). The holding capacitance electrode IO is also called “third light-transmitting electrode”. The holding capacitance electrode IO extends across the adjacent pixels Pix and is provided over the pixels Pix. A region of the holding capacitance electrode IO including the light-transmitting conductive material overlaps the scan line GL or the signal line SL, and extends to the adjacent pixel Pix.

The holding capacitance electrode IO has a grid shape that covers over the scan lines GL and the signal lines SL along the scan lines GL and the signal lines SL. This configuration reduces the holding capacitance HC between the region IOX including no light-transmitting conductive material and the pixel electrode PE. Therefore, the holding capacitance HC is adjusted by the size of the region IOX including no light-transmitting conductive material.

As illustrated in FIG. 9, the switching element Tr coupled to the scan line GL and the signal line SL is provided. At least the switching element Tr is covered with a third insulating layer 13 serving as an organic insulating layer, and a metal layer TM having a larger area than that of the switching element Tr is located above the third insulating layer 13. This configuration can reduce the light leakage of the switching element Tr.

More specifically, the array substrate 10 includes the third insulating layer 13 and the metal layer TM. The third insulating layer 13 serves as the organic insulating layer that covers at least the switching element Tr, and the metal layer TM is provided above the third insulating layer 13 so as to overlap the third insulating layer 13 and has a larger area than that of the switching element Tr. The region surrounded by the scan lines GL and the signal lines SL has a region having a smaller thickness than that of the third insulating layer 13 that overlaps the scan lines GL and the signal lines SL in plan view. This configuration forms a slant surface along which the thickness of the third insulating layer 13 changes, the slant surface being located on a side of the third insulating layer 13 closer, in plan view, to the light source 3 than the switching element Tr is. As illustrated in FIG. 5, the light-source light L emitted from the light source 3 is incident in the second direction PY serving as a direction of incidence.

As illustrated in FIG. 9, the width of the metal layer TM overlapping the signal line SL is larger than that of the signal line SL in plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scan line GL is larger than the width of the scan line GL. The width of the metal layer TM and the width of the scan line GL are lengths in a direction intersecting the extending direction of the scan line GL.

As illustrated in FIG. 10, a plurality of projections 61 provided across the pixels Pix are arranged at predetermined intervals in the first direction PX on the common electrode CE, and the projections 61 are provided so as to extend toward the second direction PY intersecting the first direction PX.

As illustrated in FIG. 11, the pixel electrodes PE are separate from each other so as to correspond to the pixels Pix. A contact electrode DEA electrically coupled to the drain electrode DE is electrically coupled to the pixel electrode PE through a contact hole CH.

Figure 12:
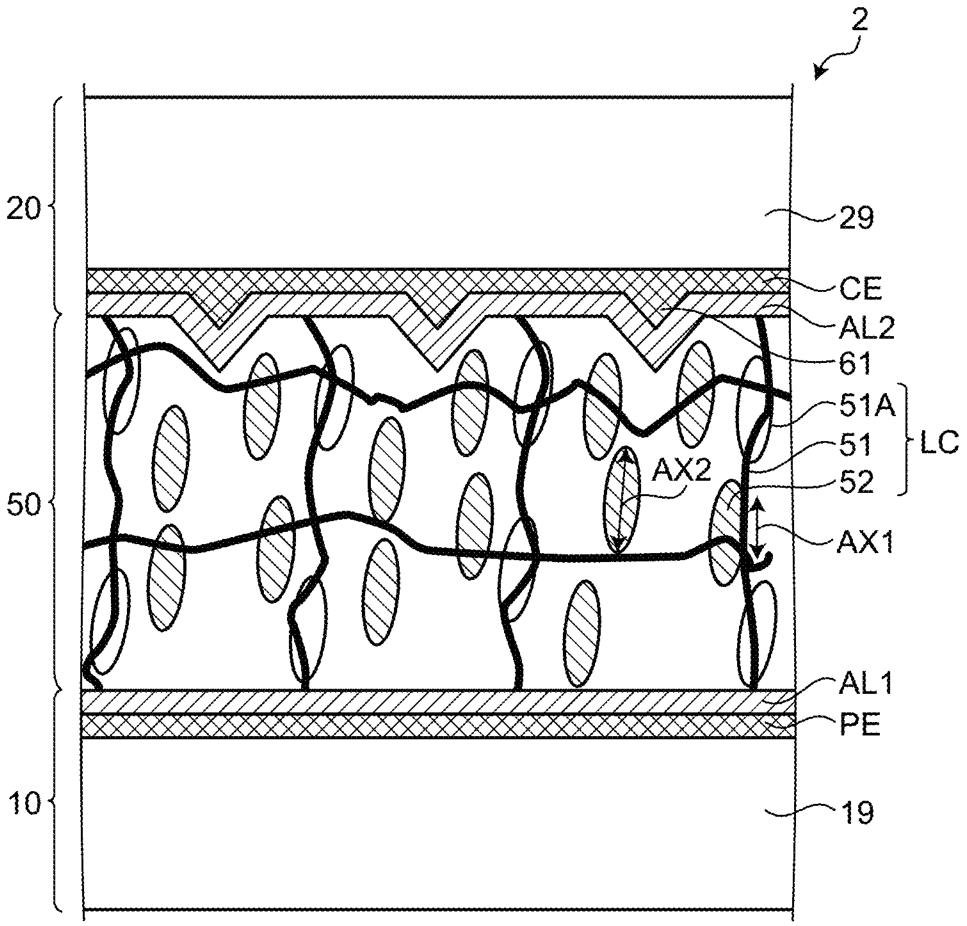
FIG. 12 is a sectional view along XII-XII' of FIGS. 10 and 11.
Figure 13:
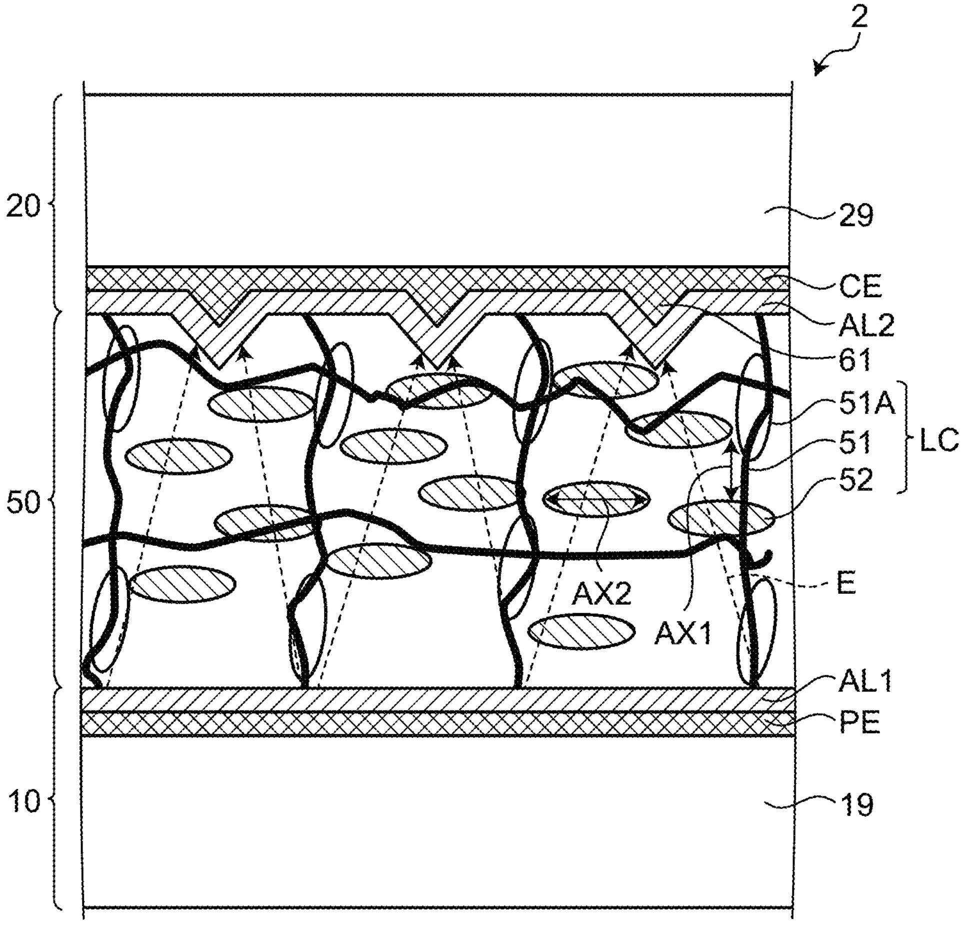
FIG. 13 is a sectional view for describing a scattering state of a liquid crystal layer.

The following describes the array substrate 10, the counter substrate 20, and the liquid crystal layer 50 included in the display panel 2. FIG. 12 is a sectional view along XII-XII' of FIGS. 10 and 11. FIG. 12 illustrates the liquid crystal layer in a state after monomers are polymerized. FIG. 12 also illustrates the liquid crystal layer in a non-scattering state. FIG. 13 is a sectional view for describing the scattering state of the liquid crystal layer.

As illustrated in FIG. 12, the array substrate 10 includes a first light-transmitting base member 19, the pixel electrode PE, and a first orientation film (orientation film) AL1. The first orientation film AL1 is provided above the pixel electrode PE. The counter substrate 20 includes a second light-transmitting base member 29, the common electrode CE, and a second orientation film (orientation film) AL2. A surface of the common electrode CE is provided with the projections 61 projecting from the counter substrate 20 side toward the array substrate 10, and provided with the second orientation film AL2 so as to cover the common electrode CE and the projections 61 entirely. The liquid crystal layer 50 is sealed between the first orientation film AL1 and the second orientation film AL2. The array substrate 10 may include a protective member (not illustrated) formed of, for example, glass, on a surface opposite to a surface of the first light-transmitting base member 19 on which the pixel electrode PE and the first orientation film (orientation film) AL1 are provided. The protective member may be made of a resin, as long as having a light-transmitting property. The counter substrate 20 may include a protective member (not illustrated) formed of, for example, glass, on a surface opposite to a surface of the second light-transmitting base member 29 on which the common electrode CE and the second orientation film (orientation film) AL2 are provided. The protective member may be made of a resin, as long as having a light-transmitting property.

The first light-transmitting base member 19 and the second light-transmitting base member 29 are formed of a light-transmitting material such as glass or polyethylene terephthalate. The pixel electrode PE and the common electrode CE are formed of a light-transmitting conductive material such as indium tin oxide (ITO). The first and the second orientation films AL1 and AL2 cause liquid crystal molecules 52 in the liquid crystal layer 50 to be oriented in a predetermined direction and are formed of a light-transmitting orientation film material such as polyimide.

As illustrated in FIG. 12, photocrosslinkable monomers 51A and the liquid crystal molecules 52 are contained between the first and the second orientation films AL1 and AL2. Irradiating the monomers 51A with ultraviolet rays having a predetermined wavelength causes a photocrosslinking (polymerizing) reaction to occur to form a three-dimensional mesh-shaped polymer network 51. This process forms the liquid crystal layer 50 including the reverse-mode polymer-dispersed liquid crystals LC in which the liquid crystal molecules 52 are dispersed in gaps of the polymer network 51.

A photocrosslinkable acrylate-based material represented by Chemical Formula 1 can be used as the monomers 51A. Each of the monomers represented by Chemical Formula 1 has acrylate groups having functions as photocrosslinkable groups at the right and left ends. The monomers 51A are not limited to those represented by Chemical Formula 1 and can be made using each of photocrosslinkable materials such as acrylate groups represented by Chemical Formulae 2-1 to 2-4 or maleimide groups represented by Chemical Formulae 2-5 to 2-8.

(1)

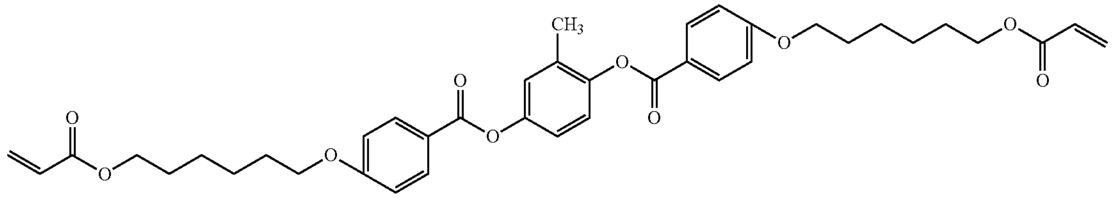

(2-1)

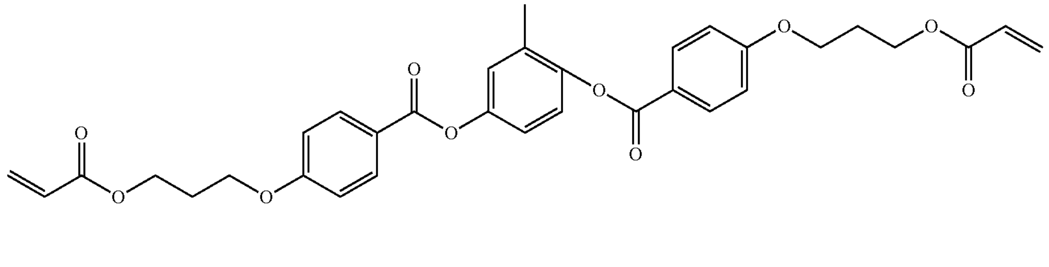

(2-2)

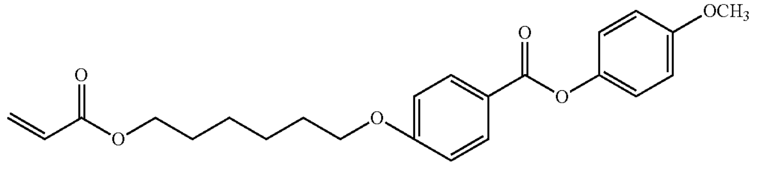

-continued (2-3)

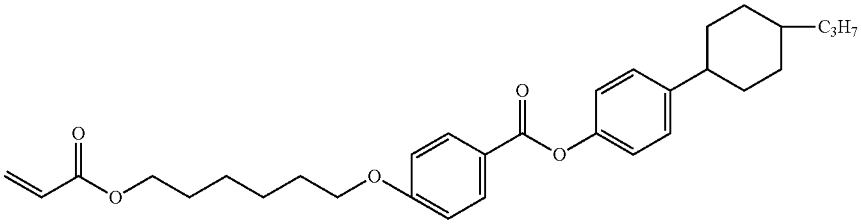

(2-4)

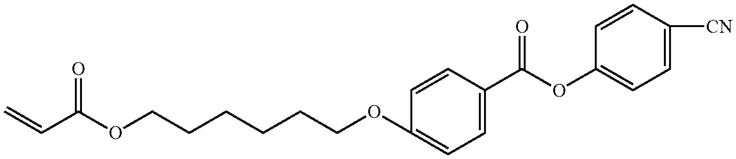

(2-5)

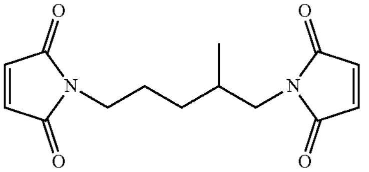

(2-6)

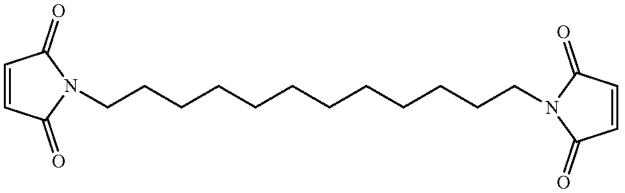

(2-7)

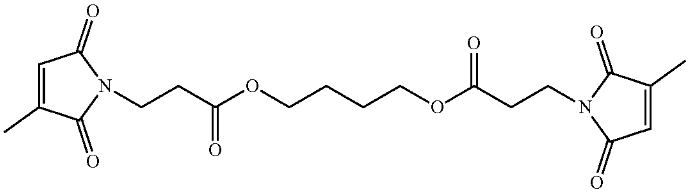

(2-8)

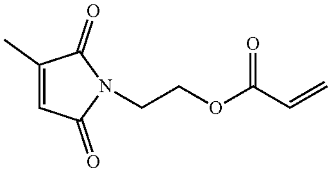

Normally, when the polymer network is formed by polymerizing the monomers, the polymer network is not fixed and floats in the liquid crystal layer. Therefore, for example, a point press or a drop impact on a screen of the display panel irreversibly moves the polymer network of the liquid crystal layer, and thereby, may disturb the orientation of the liquid crystal molecules. This phenomenon causes pixel-by-pixel unevenness and reduction in contrast of the display panel, and thus, improvement is required in impact resistance of the display device (display panel).

In the present embodiment, ends (portions) of the polymer network 51 are connected to the first and the second orientation films AL1 and AL2. As a result, the polymer network 51 is fixed to the array substrate 10 and the counter substrate 20 with the first and the second orientation films AL1 and AL2 interposed therebetween. This configuration improves the impact resistance and reliability of the display panel 2 including the liquid crystal layer 50. An end (portion) of the polymer network 51 may be coupled to only the first orientation film AL1.

The following describes the first and the second orientation films AL1 and AL2. In the present embodiment, the first and the second orientation films AL1 and AL2 are preferably orientation films that are transparent in the visible range, and are formed of polyimide. The polyimide can be obtained by heating and imidizing a polyamide acid (including a polyamide acid compound). For this purpose, a liquid polyamide acid is applied to surfaces of the pixel electrode PE and the common electrode CE by, for example, spin coating, and is imidized to form the first and the second orientation films AL1 and AL2. The polyamide acid can be synthesized by reacting a tetracarboxylic acid compound (tetracarboxylic dianhydride) with a diamine compound. Therefore, as represented by Chemical Formula 3, the polyimide is formed to have a skeleton derived from tetracarboxylic dianhydride and a skeleton derived from a diamine compound.

(3)

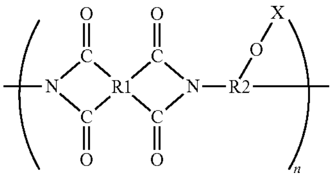

In Chemical Formula 3, R1 contained in the skeleton derived from tetracarboxylic dianhydride can be, for example, a cyclobutane skeleton, an alicyclic skeleton other than a cyclobutane skeleton, or a chain skeleton. R2 contained in the skeleton derived from a diamine compound can be, for example, an alicyclic skeleton other than a cyclobutane skeleton, or a chain skeleton. Examples of an alicyclic skeleton other than a cyclobutane skeleton include a cycloheptane skeleton and a cyclohexane skeleton. As an alicyclic skeleton, aromatic compounds can be used. However, those with less coloration of polyimide are preferable.

In the present embodiment, the polyimide serving as the material (orientation film material) of the first and the second orientation films AL1 and AL2 has a photocrosslinkable group X on a side chain of the polyimide. Specifically, the photocrosslinkable group X is provided via an ether bond to the above-mentioned R2 that forms the skeleton derived from the diamine compound. The photocrosslinking group X may be provided via an ester bond instead of an ether bond. That is, the diamine compound forming the polyimide has the photocrosslinkable group X. The photocrosslinkable group X reacts with the monomers 51A during the above-described photocrosslinking (polymerizing) reaction of the monomers 51A, and connects each of the first and the second orientation films AL1 and AL2 to the polymer network 51 (polymer fibers). This process tightly connects the first and the second orientation films AL1 and AL2 to the polymer network 51, thereby improving the impact resistance and reliability of the display panel 2 including the liquid crystal layer 50.

The photocrosslinkable group X can be provided with, for example, an acrylate group as represented by Chemical Formula 4. In this case, R illustrated in Chemical Formula 4 means a group connected to the photocrosslinkable group and includes the ether bond or the ester bond mentioned above.

(4)

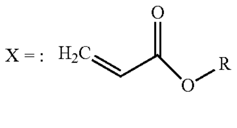

In this configuration, the photocrosslinkable group X is provided via the ether bond or the ester bond to the R2 contained in the skeleton derived from the diamine compound. As a result, the first and the second orientation films AL1 and AL2 formed of the polyimide containing the photocrosslinkable group X can be easily formed, and the first and the second orientation films AL1 and AL2 can be easily connected to the polymer network 51. Since the photocrosslinkable group X is provided on the side chain of the polyimide, the degree of freedom of orientation is higher than when the photocrosslinkable group X is provided on a polymer main chain, and the efficiency of the photocrosslinking (polymerizing) reaction between the photocrosslinkable group X and the photocrosslinkable monomers 51A can be increased during the formation of the polymer network 51.

The photocrosslinkable group X is not limited to the acrylate group. At least one of a methacrylate group, a cinnamic acid group, a maleimide group, a phenyldiazirine, and a phenylazide represented by Chemical Formulae 5-1 to 5-5 may be provided on the side chain of the polyimide. Any one of these photocrosslinkable groups X may be provided on the main chain of the polyimide, or at an end of the side chain or the main chain.

(5-1)

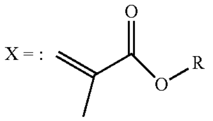

(5-2)

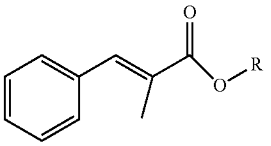

(5-3)

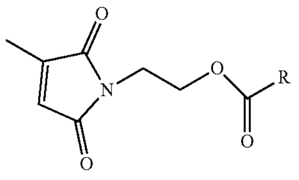

(5-4)

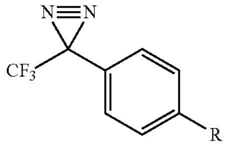

(5-5)

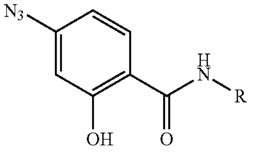

The following describes the polyimide having other configurations. Although the above has described the configurations of the polyimide having the photocrosslinkable group X on the side chain, configurations can also be employed in which the polyimide has the photocrosslinkable group on the main chain. Specifically, the polyimide having a diazo group represented by Chemical Formula 6-1 or the polyimide having a benzophenone group represented by Chemical Formula 6-2 can be employed as the photocrosslinkable group for the R1 contained in the skeleton derived from tetracarboxylic dianhydride in Chemical Formula 3. In Chemical Formulae 6-1 and 6-2, Et denotes an ethyl group. Structural formulae illustrated in Chemical Formulae 6-1 and 6-2 are examples, and other configurations may be used as long as the polyimide has a diazo group or a benzophenone group.

(6-1)

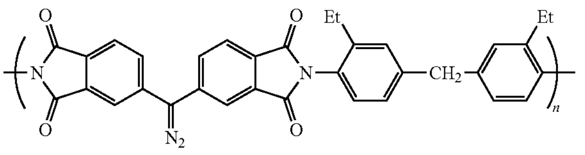

PI(DZDA/DEDPM)

(6-2)

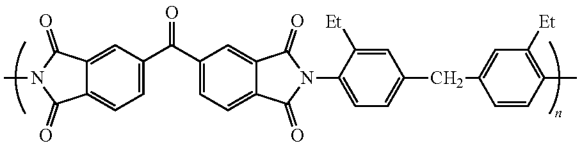

PI(BTDA/DEDPM)

In these configurations, since the polyimide originally has a functional group that serves as a photocrosslinkable group, the first and the second orientation films AL1 and AL2 can be easily connected to the polymer network 51. The photocrosslinkable group is provided on the main chain of the polyimide. Therefore, after the first and the second orientation films AL1 and AL2 are connected to the polymer network 51, the polymer network 51 is difficult to move, and thus, can be fixed.

In the above-described configurations, both the polymer network 51 and the liquid crystal molecules 52 are optically anisotropic. The orientation of the liquid crystal molecules 52 is controlled by a voltage difference between the pixel electrode PE and the common electrode CE. For example, as illustrated in FIG. 12, the orientation of an optical axis AX1 of the polymer network 51 is substantially equal to the orientation of an optical axis AX2 of the liquid crystal molecules 52 when no voltage is applied between the pixel electrode PE and the common electrode CE. The optical axis AX2 of the liquid crystal molecules 52 is parallel to the direction PZ (FIG. 5) of the liquid crystal layer 50. The optical axis AX1 of the polymer network 51 is parallel to the direction PZ of the liquid crystal layer 50 regardless of whether a voltage is applied. The voltage applied to the pixel electrode PE changes the orientation of the liquid crystal molecules 52. The degree of scattering of light passing through the pixel Pix (region on the pixel electrode PE) changes with the change in the orientation of the liquid crystal molecules 52.

In the present embodiment, considering that the first and the second orientation films AL1 and AL2 are vertical orientation films, the polyimide represented by Chemical Formula 7 is preferably used. In the polyimide represented by Chemical Formula 7, the acrylate group that is the photocrosslinkable group X is provided at an end of a side chain. This acrylate group is connected to the ether group via R3 that is a chain skeleton. This R3 is a long-chain alkyl group ($(CH_2)n$, where n=1 to 12), in particular, n=6 to 12. Furthermore, the pretilt angle of the liquid crystal molecules 52 can be more easily increased as the density of the long-chain alkyl group increases. Therefore, this configuration is effective when the orientation films are the vertical orientation films.

(7)

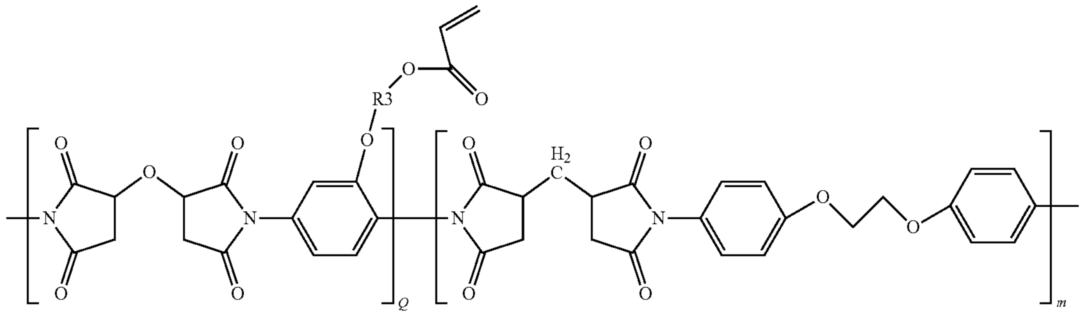

When no voltage is applied between the pixel electrode PE and the common electrode CE, the difference in refractive index between the polymer network 51 and the liquid crystal molecules 52 is zero in all directions. As a result, the liquid crystal layer 50 is placed in the non-scattering state of not scattering the light-source light L (FIG. 5). When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 13, in the gap between the pixel electrode PE and the common electrode CE having a voltage applied thereto, the optical axis AX2 of the liquid crystal molecules 52 is tilted by an electric field E generated between the pixel electrode PE and the projections 61 of the common electrode CE. Since the optical axis AX1 of the polymer network 51 is not changed by the electric field E, the orientation of the optical axis AX1 of the polymer network 51 differs from the orientation of the optical axis AX2 of the liquid crystal molecules 52. The light-source light L is scattered in the pixel Pix including the pixel electrode PE having a voltage applied thereto. The viewer views a part of the light-source light L that is emitted outward from the first principal surface 10A of the array substrate 10 or the first principal surface 20A of the counter substrate 20 as described above.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is received from the image transmitter 91, the voltage is applied to the pixel electrode PE of the pixel Pix for displaying an image, and an image based on the third input signal VCSA becomes visible together with the background. In this manner, the image is displayed in the display region when the polymer-dispersed liquid crystals LC are in the scattering state.

The light-source light L is scattered in the pixel Pix including the pixel electrode PE having a voltage applied thereto, and emitted outward to display the image, which is displayed so as to be superimposed on the background. That is, the display device 1 of the present embodiment can display the image so as to be superimposed on the background by combining the emission light 68 or 68A with the background.

The electric field E generated between the pixel electrode PE and the common electrode CE is applied in oblique directions toward the projections 61 because the potential is higher on the projections 61 than on flat surfaces of the common electrode CE. This configuration allows the electric field E to control the orientation direction of the liquid crystal molecules 52.

Method for Manufacturing Display Device 1

Figure 14:
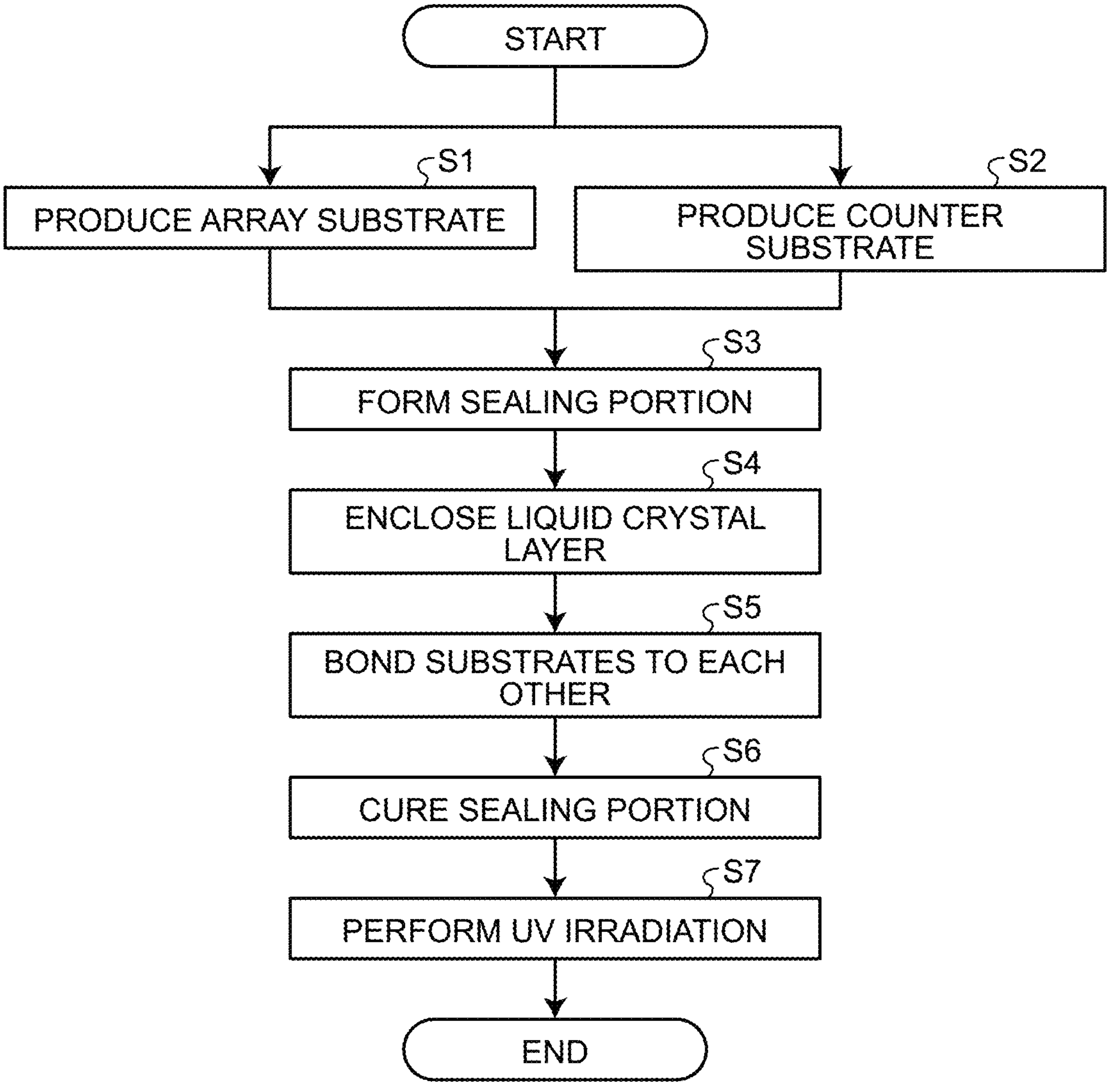
FIG. 14 is a flowchart illustrating an example of a method for manufacturing the display device in the first embodiment.
Figure 15:
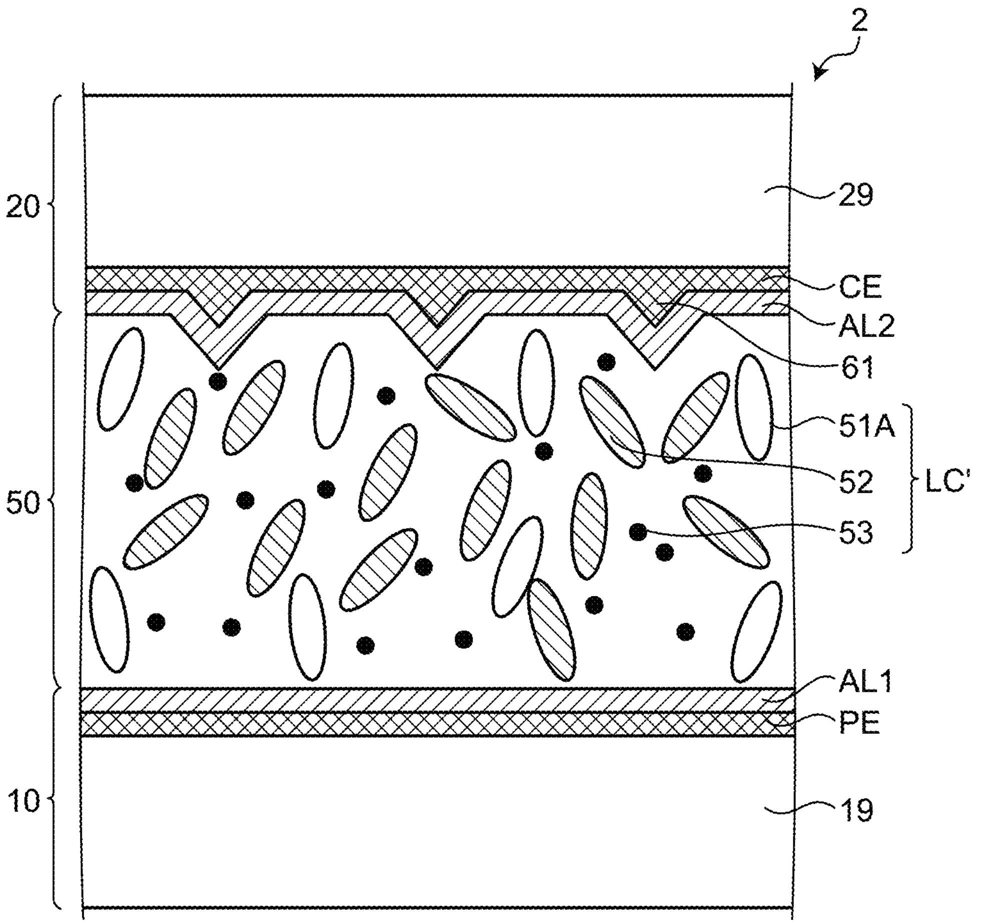
FIG. 15 is a sectional view illustrating a state before monomers in the liquid crystal layer are polymerized.
Figure 16:
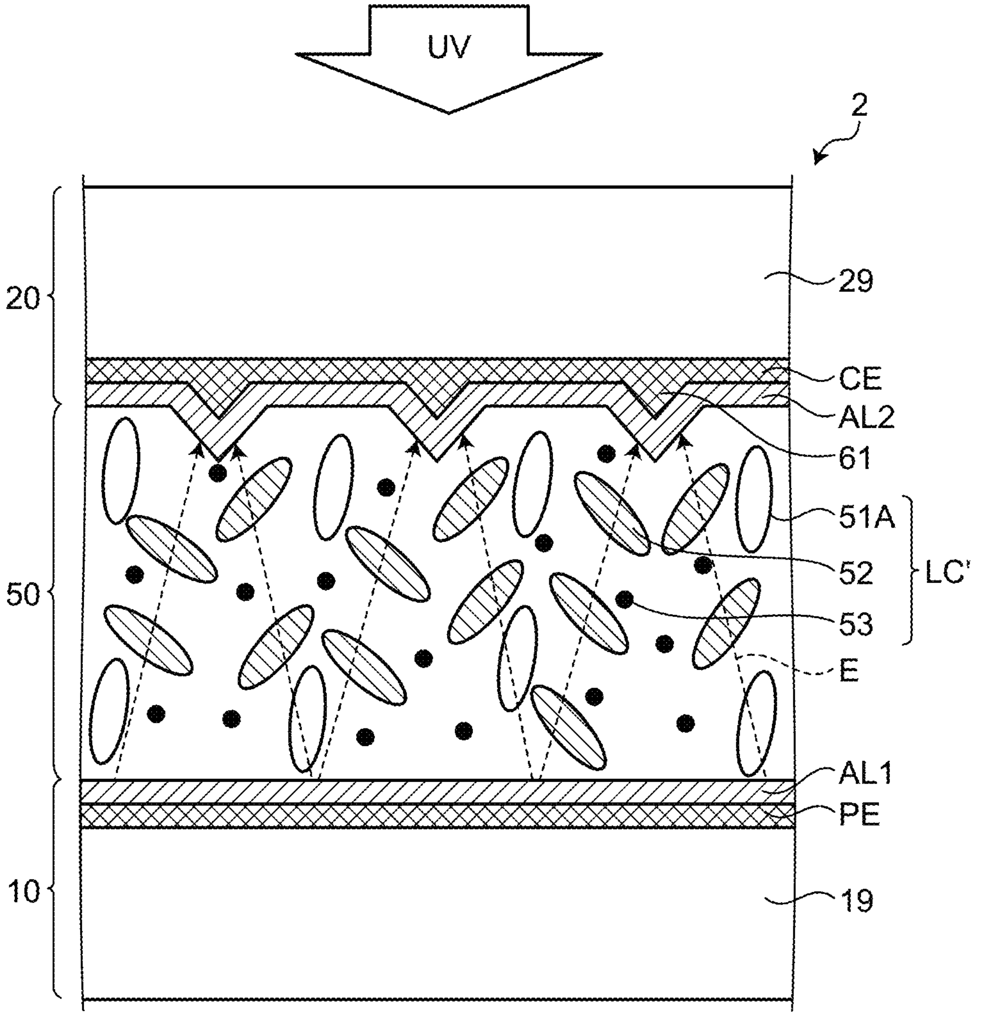
FIG. 16 is a sectional view illustrating a state in which the liquid crystal layer is irradiated with ultraviolet rays while a voltage is applied thereto.
Figure 17:
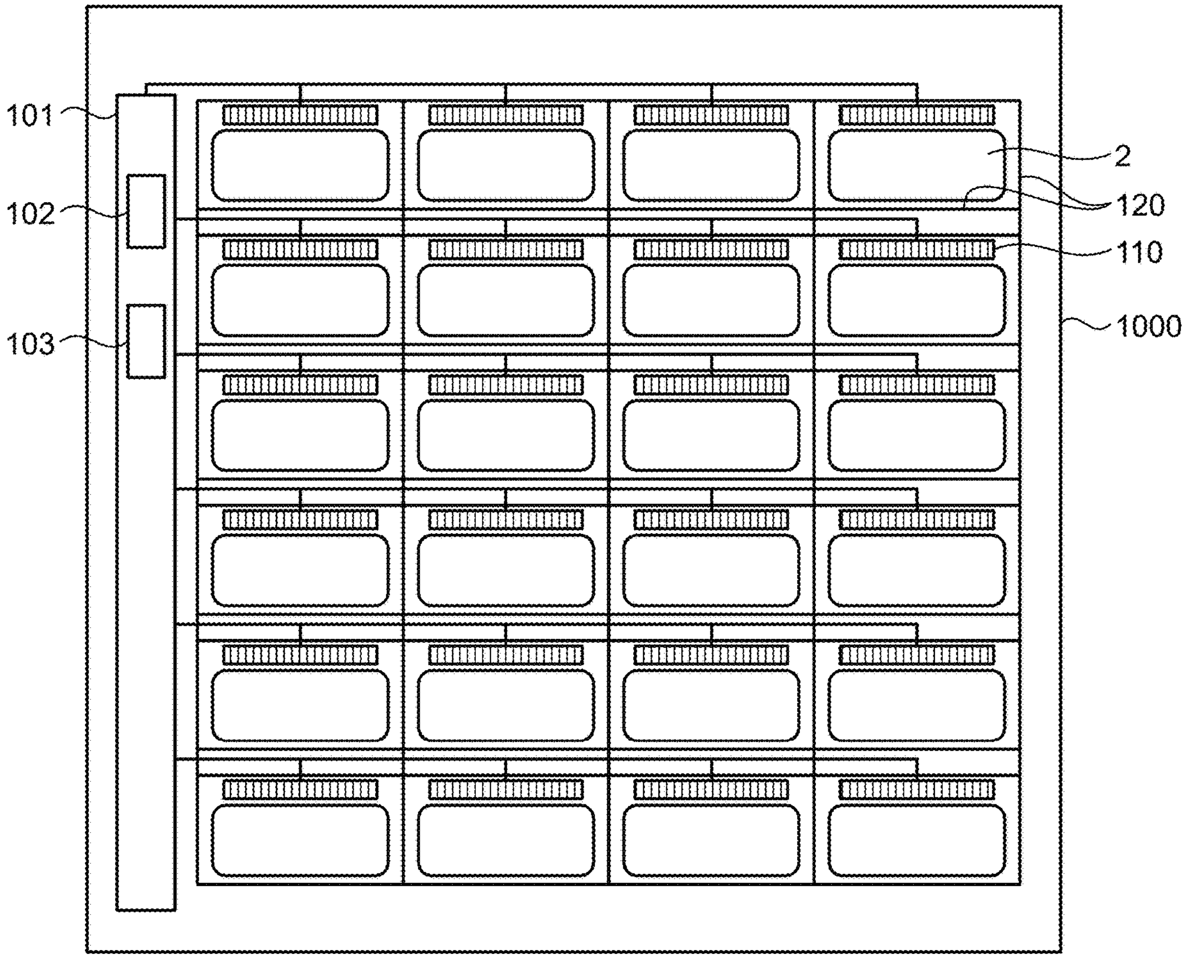
FIG. 17 is a layout diagram illustrating display panels arranged on a motherboard of the first embodiment.

The following describes a method for manufacturing the display device 1. FIG. 14 is a flowchart illustrating an example of the method for manufacturing the display device in the first embodiment. FIG. 15 is a sectional view illustrating a state before the monomers in the liquid crystal layer are polymerized. FIG. 16 is a sectional view illustrating a state in which the liquid crystal layer is irradiated with the ultraviolet rays while a voltage is applied thereto. FIG. 17 is a layout diagram illustrating the display panels arranged on a motherboard of the first embodiment.

As illustrated in FIG. 14, first, the array substrate 10 with the pixel electrodes PE formed on the first light-transmitting base member 19 is produced (S1). The first orientation film AL1 is stacked on the entire surface of the pixel electrode PE. The counter substrate 20 with the common electrode CE formed on the second light-transmitting base member 29 is produced (S2). The second orientation film AL2 is stacked on the entire surface of the common electrode CE.

In Manufacturing Process S2, the projections 61 projecting from the common electrode CE toward the pixel electrode PE are formed on the common electrode CE so as to extend in the second direction PY and arranged in the first direction PX with predetermined gaps interposed therebetween. The projections 61 are, for example, triangular in sectional shape. The shape of the projections 61 is not limited and may be semicircular, trapezoidal, or other in sectional shape.

The following describes a method for injecting a solution LC' inside the sealing portion 18 in Manufacturing Processes S3 to S5. Examples of the method include a vacuum injection method and a one-drop filling (ODF) method. In the vacuum injection method, an inlet is formed in the sealing portion 18, and the solution LC' is injected through the inlet after the sealing portion 18 is cured. In the ODF method, the sealing portion 18 is formed on either one of the array substrate and the counter substrate, and the solution LC' is dropped inside the sealing portion 18. In the present embodiment, the method for manufacturing the display device 1 using the ODF method will be described.

After Manufacturing Processes S1 and S2, the uncured sealing portion 18 is formed on either one of the array substrate 10 and the counter substrate 20 (S3). The sealing portion 18 can be annularly formed using, for example, a dispenser. In the ODF method, the sealing portion 18 has an unbroken continuous annular shape because no inlet is formed in the sealing portion 18.

After Manufacturing Process S3, the solution LC' is dropped inside the sealing portion 18 (S4). Then, the array substrate 10 is bonded to the counter substrate 20 by the sealing portion 18 in a vacuum (S5). As a result, the liquid crystal layer 50 is formed in a space surrounded by the array substrate 10, the counter substrate 20, and the sealing portion 18 (refer to FIG. 5).

After Manufacturing Process S5, the sealing portion 18 is cured (S6). First, heat at a temperature at which an uncured acrylic resin contained in the sealing portion 18 is cured is applied to the sealing portion 18. Radical polymerization proceeds in the acrylic resin under the action of a thermal radical polymerization initiator contained in the sealing portion 18. Since the reaction rate of the radical polymerization is high, the acrylic resin can be cured in a short time.

Then, heat at a temperature at which an uncured epoxy resin in the sealing portion 18 is cured is applied to the sealing portion 18. Addition polymerization proceeds in the epoxy resin under the action of a thermosetting agent contained in the sealing portion 18. Since the reaction rate of the addition polymerization is lower than that of the radical polymerization, the epoxy resin can be cured over a longer time than that of the process to cure the acrylic resin.

At this time, as illustrated in FIG. 15, surfaces of the first and the second orientation films AL1 and AL2 (surfaces in contact with the liquid crystal layer 50) have not undergone the orientation treatment, so that the orientation states of the monomers 51A and the liquid crystal molecules 52 are each a state of tilted in random directions before the monomers 51A are polymerized.

As illustrated in FIG. 15, the solution LC' containing the photocrosslinkable monomers 51A, the liquid crystal molecules 52, and photopolymerization initiators 53 is injected between the array substrate 10, the counter substrate 20, and the sealing portion 18.

The ultraviolet irradiation at a predetermined wavelength absorbs light, and causes the photopolymerization initiators 53 to generate radicals to initiate the polymerization of the monomers 51A in the solution LC'. A material suitable for the ultraviolet wavelength to be used can be selected and used as the photopolymerization initiators 53. For example, one of the following can be used.

(±)-camphorquinone, acetophenone, benzophenone, 4-benzoylbenzoic acid, 2-benzoylbenzoic acid, methyl 2-benzoylbenzoate, 4,4'-bis(dimethylamino)benzophenone, 4,4'-bis(diethylamino)benzophenone, 4,4'-dichlorobenzophenone, 1,4-dibenzophenone, benzil, p-anisyl, 2-benzoyl-2-propanol, 2-hydroxy-4'-(2-hydroxyethoxy)-2-methylpropiophenone, 1-benzylcyclohexanol, benzoin, benzoin methyl ether, benzoin ethyl ether, benzoin isopropyl ether, benzoin butyl ether, o-tosyl benzoin, 2,2-diethoxyacetophenone, benzyl dimethyl ketal, 2-methyl-4'-(methylthio)-2-morpholinopropiophenone, 2-benzyl-2-(dimethylamino)-4'-monoholinobutyrophenone, 2-isonitrosopropiophenone, 2-chlorothioxanthone, 2-isopropylthioxanthone, 2,4-diethylthioxanthen-9-one, 2,2'-bis(2-chlorophenyl)-4,4,5,5'-tetraphenyl-1,2'-biimidazole, diphenyl(2,4,6-trimethylbenzoyl) phosphine oxide, phenylbis(2,4,6-trimethylbenzoyl) phosphine oxide, and lithium phenyl (2,4,6-trimethylbenzoyl) phosphinate.

After Manufacturing Process S6, the entire surface of the liquid crystal layer 50 is irradiated with ultraviolet rays UV while applying a voltage to the common electrode CE and each pixel electrode PE (S7). First, as illustrated in FIG. 16, the voltage is applied to the common electrode CE and each pixel electrode PE to apply an electric field in oblique directions from the pixel electrodes PE toward the projections 61 of the common electrode CE. Since this operation causes the monomers 51A and the liquid crystal molecules 52 to be tilted under the influence of the oblique direction of the electric field, the pretilt angle results to be 85 to 88 degrees with respect to the surface of the counter substrate 20. The magnitude of the voltage is a low voltage at which the light starts to scatter in the pixel.

Then, as illustrated in FIG. 16, the entire surface of the liquid crystal layer 50 is irradiated with the ultraviolet rays UV while the voltage is applied to the common electrode CE and each pixel electrode PE. This operation causes the monomers 51A to form a three-dimensionally meshed polymer network 51 through the photocrosslinking (polymerizing) reaction, and thus, cures the liquid crystals LC (refer to FIG. 12).

In Manufacturing Process S7, as illustrated in FIG. 17, a plurality of the display panels 2 are arranged in a matrix having a row-column configuration on a mother glass 1000. The mother glass 1000 includes the display panels 2, a power supply 101, and cutting lines 120. The power supply 101 includes a pixel potential supplier 102 and a common potential supplier 103. The power supply 101 is coupled to each of the display panels 2 through wiring drawn from a terminal 110 of each of the display panel 2. By applying a voltage to each of the display panels 2, a pixel potential is supplied from the pixel potential supplier 102 to each of the pixel electrodes PE of the display panels 2. A common potential is supplied from the common potential supplier 103 to each of the common electrodes CE of the display panels 2.

After Manufacturing Process S7, each of the display panels 2 is cut off from the mother glass 1000 along the cutting lines 120 on the mother glass 1000.

When the solution LC' is injected inside the sealing portion 18 using the vacuum injection method, Manufacturing Process S7 is performed for each of the display panels 2 after the display panels 2 are cut off from the mother glass 1000. Examples of the method of applying the voltage to each of the display panels 2 include a method of applying the voltage to the display panel 2 mounted on an inspection pad or an inspection jig and a method of applying the voltage to the display panel 2 coupled to an external power supply through lead wiring lines.

Figure 18:
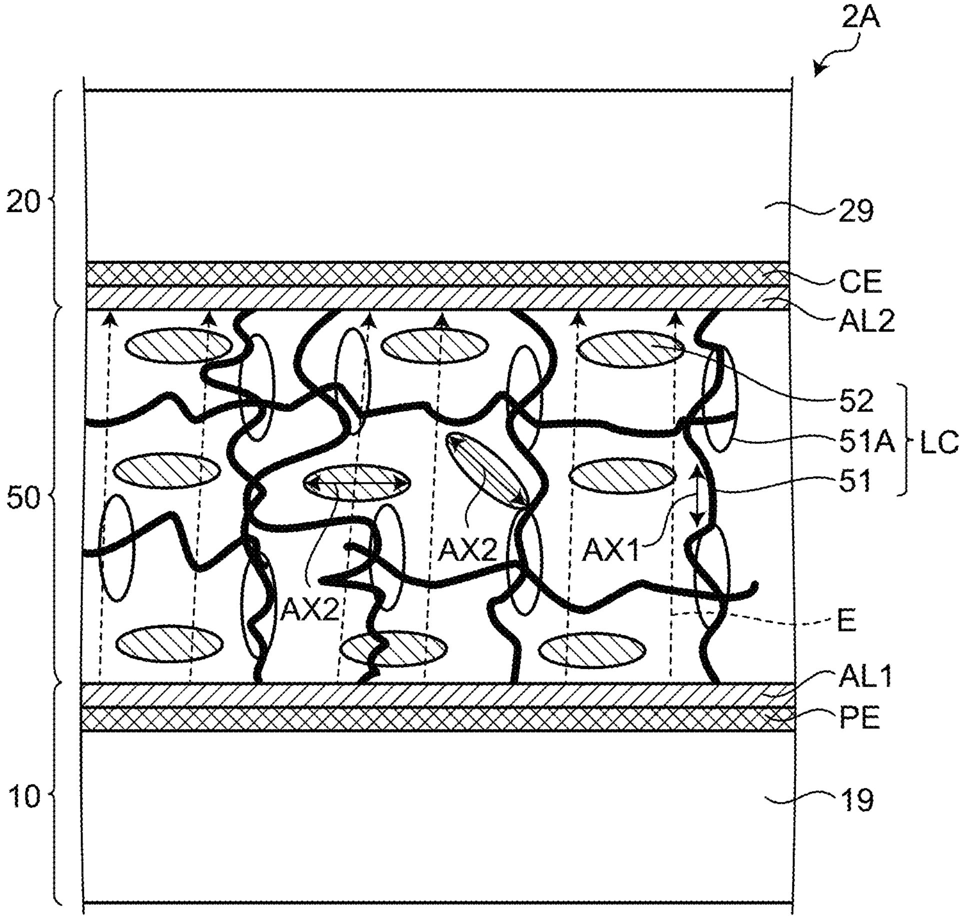
FIG. 18 is a sectional view for describing the scattering state of the liquid crystal layer according to a comparative example.

FIG. 18 is a sectional view for describing the scattering state of the liquid crystal layer according to a comparative example. Compared with the display panel 2 illustrated in FIG. 14, a display panel 2A according to the comparative example illustrated in FIG. 18 does not have the projections 61, which are formed on the common electrode CE of the display panel 2.

As illustrated in FIG. 18, in the display panel 2A according to the comparative example, in the gap between the pixel electrode PE and the common electrode CE having a voltage applied thereto, the optical axis AX2 of the liquid crystal molecules 52 is tilted by an electric field generated between the pixel electrode PE and the common electrode CE. Since the optical axis AX1 of the polymer network 51 is not changed by the electric field, the orientation of the optical axis AX1 of the polymer network 51 differs from the orientation of the optical axis AX2 of the liquid crystal molecules 52. However, the initial orientation of the liquid crystal molecules 52 in a central portion of the liquid crystal layer 50 varies. Therefore, the orientations of the optical axes AX2 may differ between the liquid crystal molecules 52. As a result, the light may scatter in the liquid crystal layer 50.

In contrast, in manufacturing the display panel 2 according to the first embodiment, the projections 61 are formed on the common electrode CE, and the liquid crystal layer 50 is cured by irradiating the entire surface of the liquid crystal layer 50 with the ultraviolet rays while the voltage is applied to the pixel electrode PE and common electrode CE. As a result, the electric field E generated between the pixel electrode PE and the common electrode CE is applied in the oblique directions toward the projections 61, so that the electric field E can control the orientations of the optical axes AX2 of the liquid crystal molecules 52 to intended directions.

As a result, the liquid crystal molecules 52 are affected by the electric field E applied obliquely with respect to the third direction PZ, and the orientations of the optical axes AX2 of the liquid crystal molecules 52 are entirely rotated by the electric field E while being restrained from behaving randomly. Thus, the pretilt angle of 85 to 88 degrees with respect to the surface of the array substrate 10 is given to the liquid crystal molecules 52, and scattering characteristics of the liquid crystal molecules depending on the applied voltage are restrained from varying.

Second Embodiment

Figure 19:
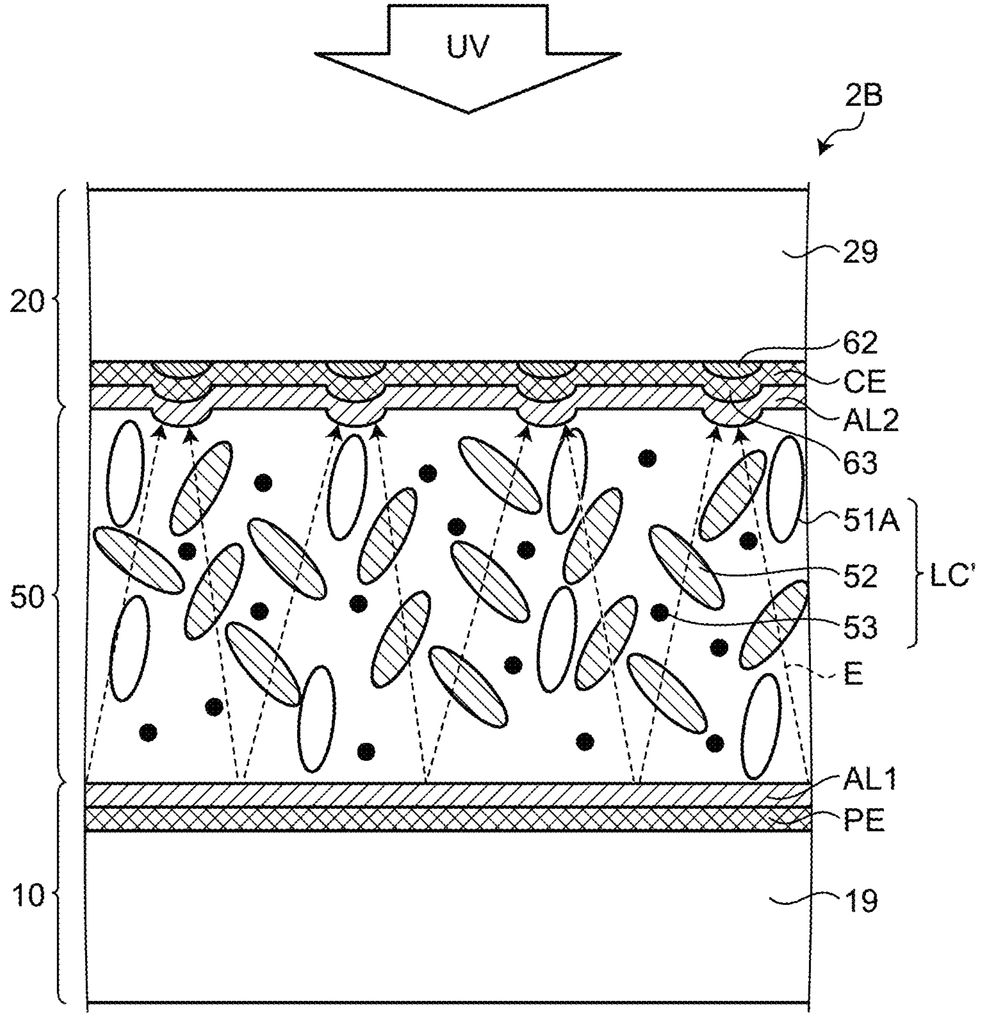
FIG. 19 is a sectional view illustrating a state in which the liquid crystal layer according to a second embodiment of the present disclosure is irradiated with the ultraviolet rays while a voltage is applied thereto.
Figure 20:
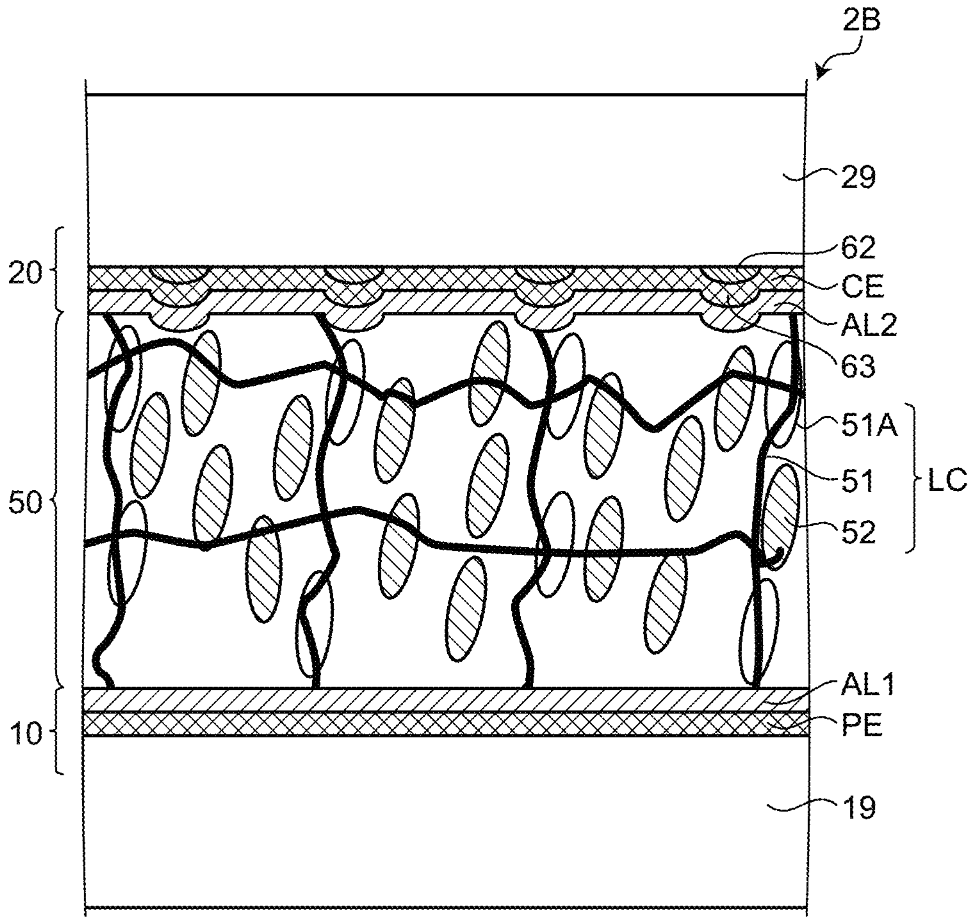
FIG. 20 is a sectional view illustrating a state in which the liquid crystal layer according to the second embodiment has been cured.

FIG. 19 is a sectional view illustrating a state in which the liquid crystal layer according to a second embodiment of the present disclosure is irradiated with the ultraviolet rays while a voltage is applied thereto. FIG. 20 is a sectional view illustrating a state in which the liquid crystal layer according to the second embodiment has been cured. The same components as those described in the first embodiment above are denoted by the same reference numerals, and the description thereof will not be repeated.

As illustrated in FIG. 19, in a process to produce the counter substrate 20 of a display panel 2B according to the second embodiment, a plurality of resin material portions 62, the common electrode CE, and the second orientation film AL2 are stacked in this order on the second light-transmitting base member 29. A plurality of projections 63 are formed on the common electrode CE. The resin material portions 62 are formed so as to stack on the projections 63 with respect to the third direction PZ and overlap the projections 63. The resin material portions 62 projecting toward the array substrate 10 with respect to the second light-transmitting base member 29 are formed between the second light-transmitting base member 29 and the projections 63.

The resin material portions 62 are formed of a flexible resin such as polyimide. The resin material portions 62 are provided as bases for the projections 63. The resin material portions 62 are, for example, semicircular in sectional shape. This shape causes the projections 63 of the common electrode CE to curve and facilitates the electric field E to be collected to the projections 63. The shape of the resin material portions 62 is not limited and may be triangular, trapezoidal, or other in sectional shape.

As illustrated in FIG. 19, in the process to cure the liquid crystal layer 50 by irradiating the liquid crystal layer 50 with the ultraviolet rays while applying a voltage to the pixel electrode PE and the common electrode CE so as to produce a potential difference between the pixel electrode PE and the common electrode CE, the electric field E is applied from the pixel electrode PE toward the projections 63 in oblique directions with respect to the third direction PZ. As a result, as illustrated in FIG. 20, the liquid crystal molecules 52 are affected by the electric field E applied obliquely with respect to the third direction PZ, and the orientations of the optical axes AX2 of the liquid crystal molecules 52 are entirely rotated by the electric field E while being restrained from behaving randomly. Thus, the pretilt angle of 85 to 88 degrees with respect to the surface of the array substrate 10 is given to the liquid crystal molecules 52, and the scattering characteristics of the liquid crystal molecules depending on the applied voltage are restrained from varying.

Third Embodiment

Figure 21:
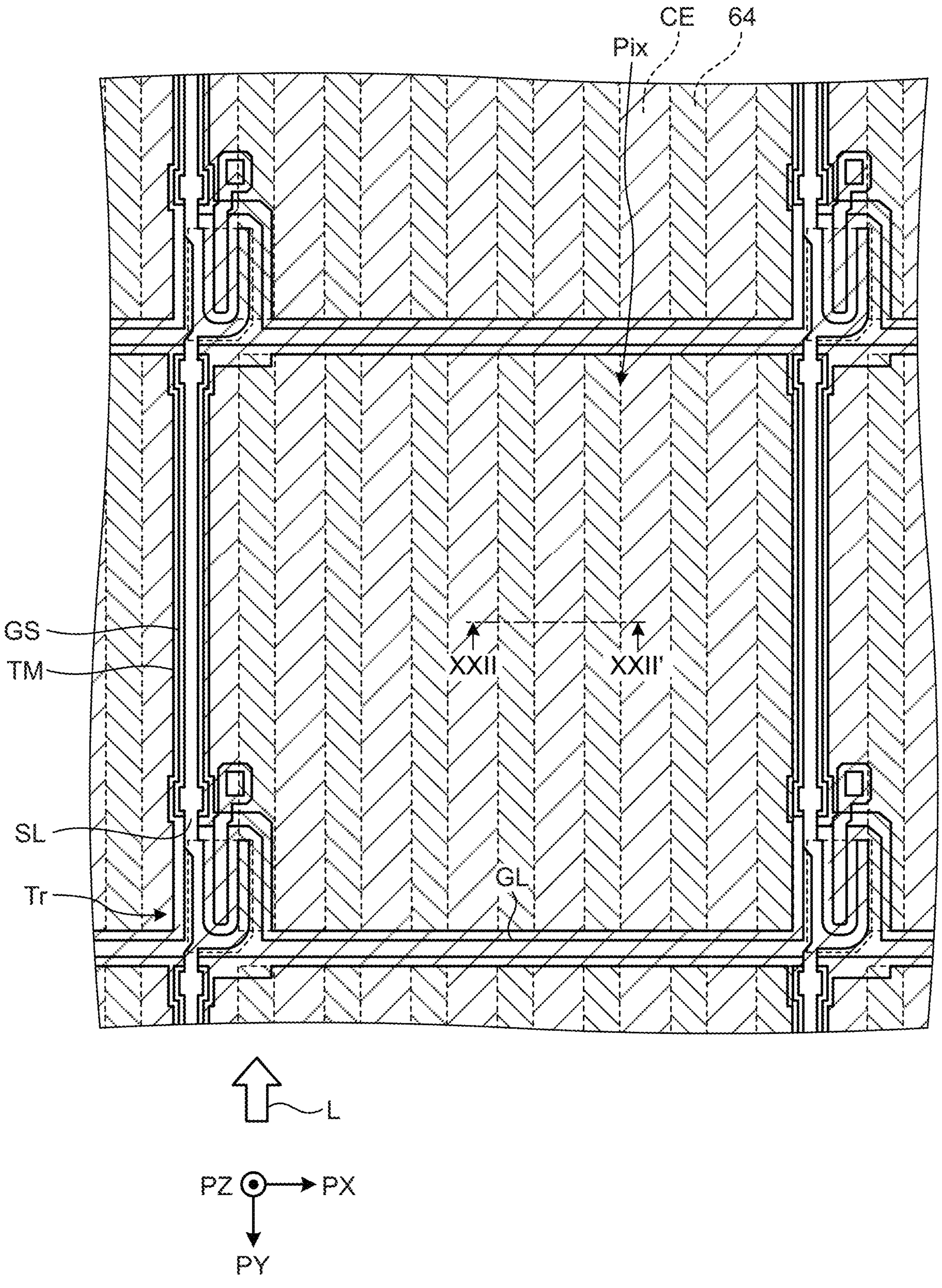
FIG. 21 is a plan view for describing the common electrode according to a third embodiment of the present disclosure.
Figure 22:
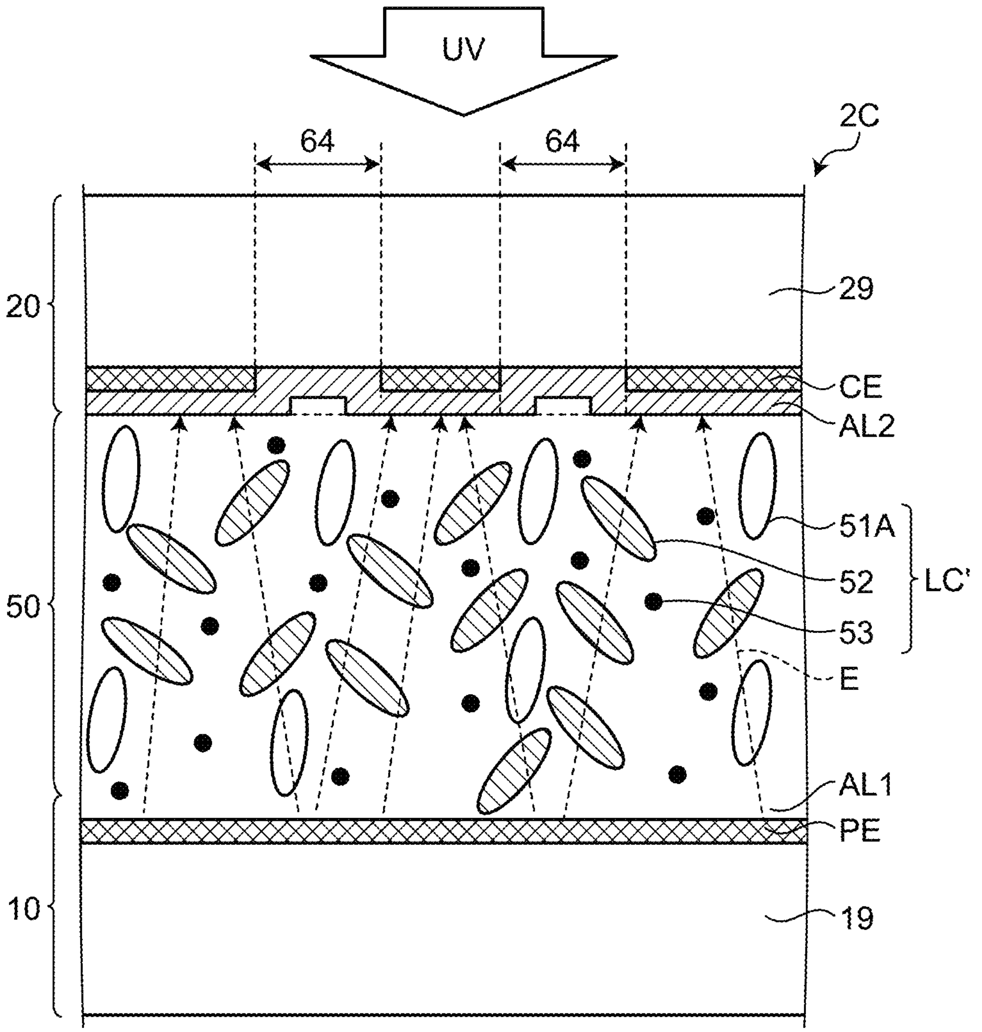
FIG. 22 is a sectional view along XXII-XXII' of FIG. 21.
Figure 23:
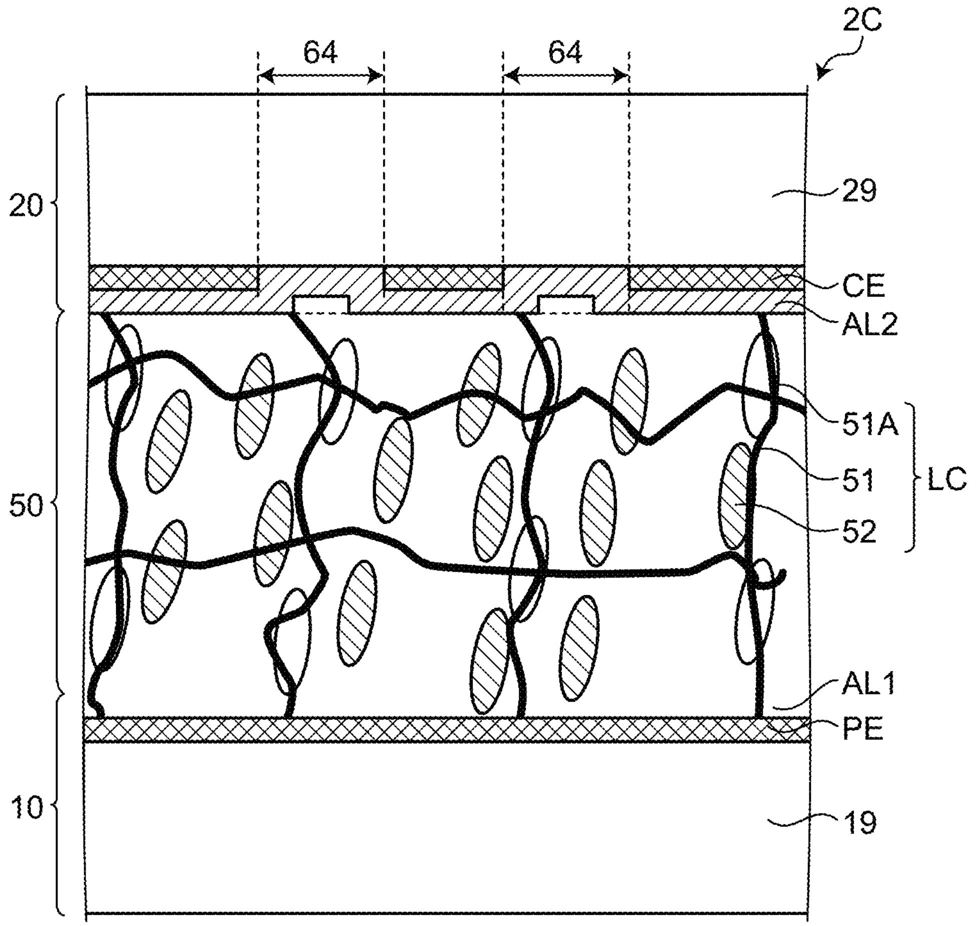
FIG. 23 is a sectional view illustrating a state in which the liquid crystal layer according to the third embodiment has been cured.

FIG. 21 is a plan view for describing the common electrode according to a third embodiment of the present disclosure. FIG. 22 is a sectional view illustrating a state in which the liquid crystal layer according to the third embodiment is irradiated with the ultraviolet rays while the voltage is applied thereto. FIG. 23 is a sectional view illustrating a state in which the liquid crystal layer according to the third embodiment has been cured. The same components as those described in the first embodiment above are denoted by the same reference numerals, and the description thereof will not be repeated.

As illustrated in FIG. 21, a plurality of slits 64 are formed between the common electrodes CE for each of the pixels Pix according to the third embodiment. The slits 64 are arranged at predetermined intervals in the first direction PX, and each of the slits 64 is formed so as to extend in the second direction PY intersecting the first direction PX. The ends of the slit 64 are coupled to the scan lines GL. The ends of the slit 64 are closed by the light-transmitting conductive material of the common electrode CE at locations overlapping the scan lines GL. The width of the slit 64 is 10 μm, for example. The width of the slit 64 is preferably 3 μm to 20 μm.

As illustrated in FIG. 22, in a process to produce the counter substrate 20 of a display panel 2C according to the third embodiment, the common electrode CE and the second orientation film AL2 are stacked in this order on the second light-transmitting base member 29. The slits 64 are formed in the common electrode CE. The second orientation film AL2 is formed so as to cover the surfaces of the common electrode CE and the slits 64.

As illustrated in FIG. 22, in the process to cure the liquid crystal layer 50 by irradiating the liquid crystal layer 50 with the ultraviolet rays while applying a voltage to the pixel electrode PE and the common electrode CE so as to produce a potential difference between the pixel electrode PE and the common electrode CE, when the electric field E is generated from the pixel electrode PE toward the common electrode CE, the electric field E is not applied to the slits 64 because no common electrode CE is provided in the slits 64.

Therefore, the electric field E is applied in oblique directions from the pixel electrode PE to the common electrode CE provided on opposite sides of the slit 64. As a result, as illustrated in FIG. 23, the liquid crystal molecules 52 are affected by the electric field E applied obliquely with respect to the third direction PZ, and the orientations of the optical axes AX2 of the liquid crystal molecules 52 are entirely rotated by the electric field E while being restrained from behaving randomly. Thus, the pretilt angle of 85 to 88 degrees with respect to the surface of the array substrate 10 is given to the liquid crystal molecules 52, and the scattering characteristics of the liquid crystal molecules depending on the applied voltage are restrained from varying.

Fourth Embodiment

Figure 24:
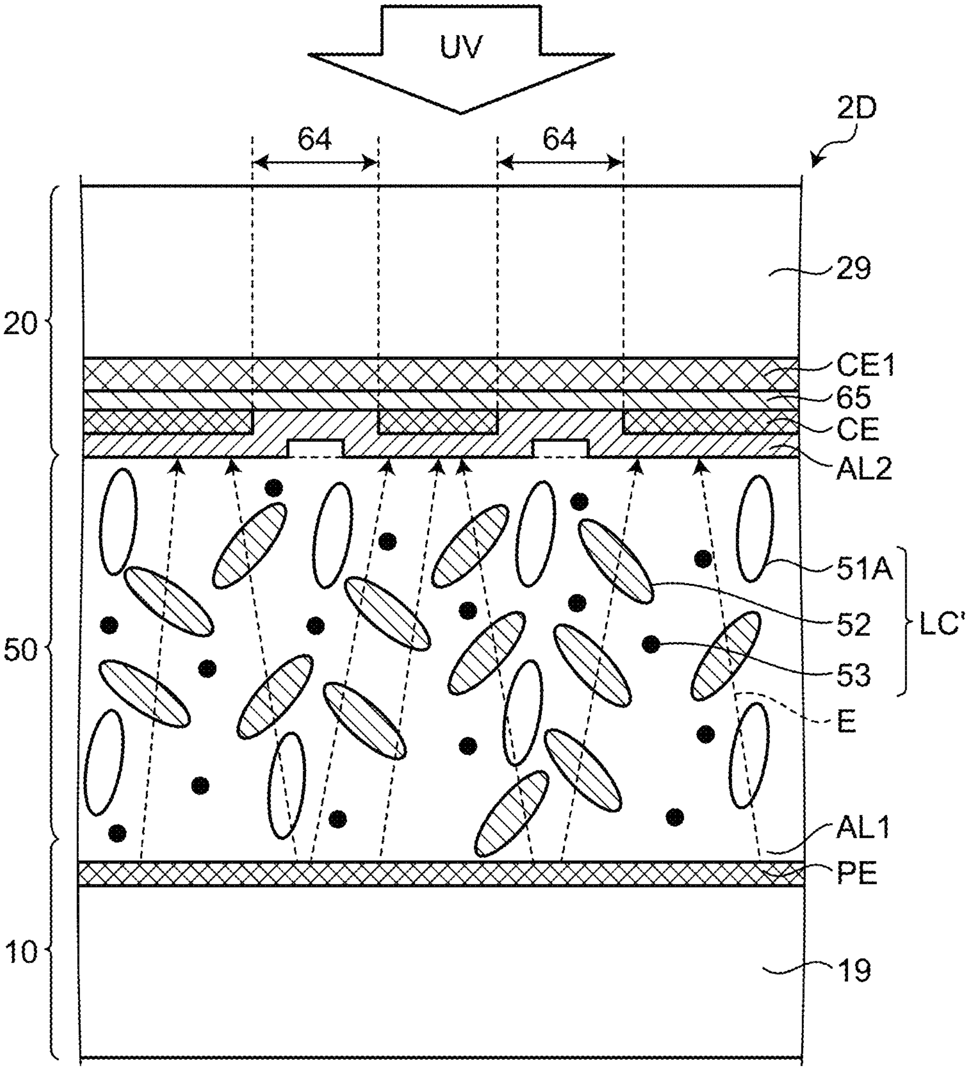
FIG. 24 is a sectional view illustrating a state in which the liquid crystal layer according to a fourth embodiment of the present disclosure is irradiated with the ultraviolet rays while a voltage is applied thereto.
Figure 25:
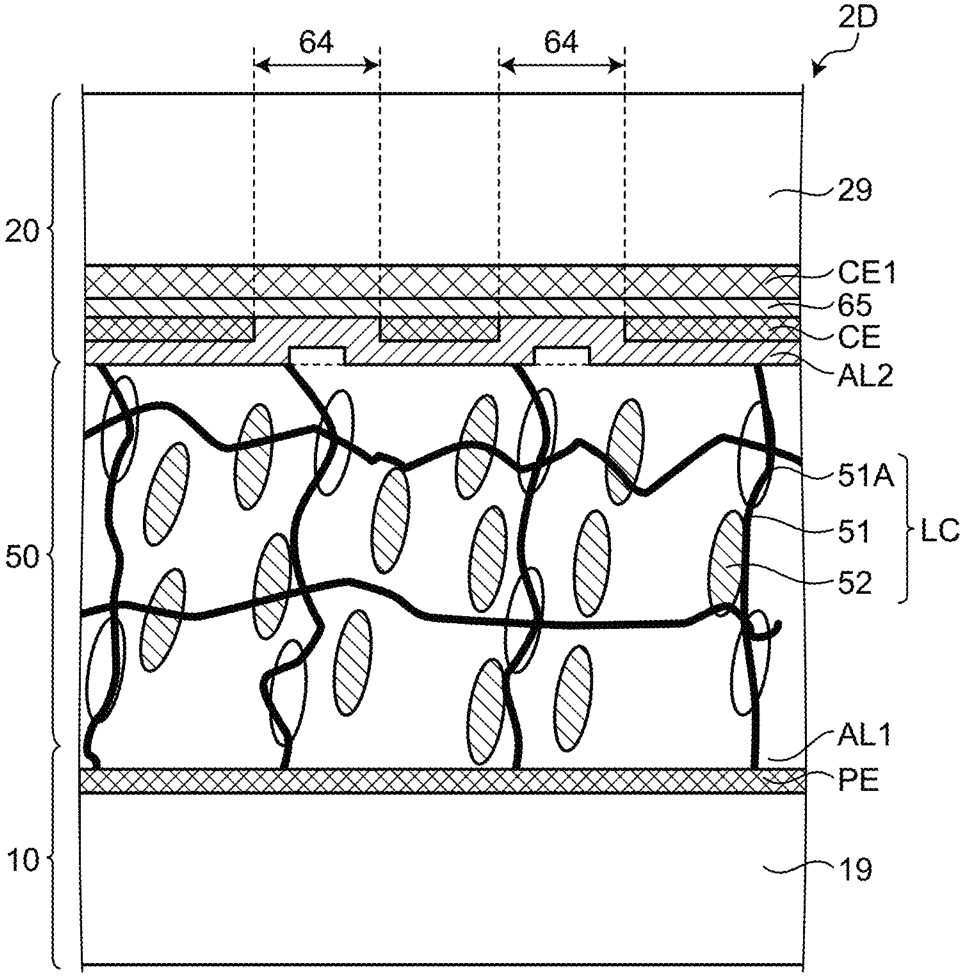
FIG. 25 is a sectional view illustrating a state in which the liquid crystal layer according to the fourth embodiment has been cured.

FIG. 24 is a sectional view illustrating a state in which the liquid crystal layer according to a fourth embodiment of the present disclosure is irradiated with the ultraviolet rays while a voltage is applied thereto. FIG. 25 is a sectional view illustrating a state in which the liquid crystal layer according to the fourth embodiment has been cured. The same components as those described in the embodiments above are denoted by the same reference numerals, and the description thereof will not be repeated.

As illustrated in FIG. 24, in a process to produce the counter substrate 20 of a display panel 2D according to the fourth embodiment, a third electrode CE1, a light-transmitting insulating film 65, the common electrode CE, and the second orientation film AL2 are stacked in this order on the second light-transmitting base member 29. The slits 64 are formed between the common electrodes CE. The third electrode CE1 has the same potential as the common electrode CE.

The insulating film 65 is an organic insulating film formed, for example, of a light-transmitting organic insulating material.

As illustrated in FIG. 24, in the process to cure the liquid crystal layer 50 by irradiating the liquid crystal layer 50 with the ultraviolet rays while applying a voltage to the pixel electrode PE and the common electrode CE so as to produce a potential difference between the pixel electrode PE and the common electrode CE, when the electric field E is generated from the pixel electrode PE toward the common electrode CE, a stronger electric field is likely to be applied to the common electrode CE than to the third electrode CE1 because the insulating film 65 covering portions of the third electrode CE1 that overlap the slits 64 makes it difficult for the electric field E to be applied to the slits 64.

Therefore, the electric field E is applied in oblique directions from the pixel electrode PE to the common electrode CE on both sides of each of the slits 64. As a result, as illustrated in FIG. 25, the liquid crystal molecules 52 are affected by the electric field E applied obliquely with respect to the third direction PZ, and the orientations of the optical axes AX2 of the liquid crystal molecules 52 are entirely rotated by the electric field E while being restrained from behaving randomly. Thus, the pretilt angle of 85 to 88 degrees with respect to the surface of the array substrate 10 is given to the liquid crystal molecules 52, and the scattering characteristics of the liquid crystal molecules depending on the applied voltage are restrained from varying. When driving the display device 1, a voltage may also be supplied to the third electrode CE1 to drive the display device 1.

While the preferred embodiments have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

What is claimed is:

1. A method for manufacturing a display device, the method comprising:

producing an array substrate in which a plurality of first electrodes are formed on a first light-transmitting base member;

producing a counter substrate in which a plurality of second electrodes are formed on a second light-transmitting base member facing the first light-transmitting base member;

forming a sealing portion on one of the array substrate and the counter substrate;

dropping, inside the sealing portion, polymer-dispersed liquid crystals that contain photocrosslinkable monomers and liquid crystal molecules in gaps between the monomers;

bonding the array substrate to the counter substrate, and forming a liquid crystal layer in which the polymer-dispersed liquid crystals have been dropped; and curing the liquid crystal layer by irradiating the liquid crystal layer with ultraviolet rays while a voltage is applied to the first electrodes and the second electrodes so as to produce a potential difference between the first electrodes and the second electrodes, wherein at the producing the counter substrate, a plurality of slits for each pixel are formed between the second electrodes along a second direction intersecting a first direction at predetermined intervals in the first direction in a plane parallel to a surface of the second light-transmitting base member, at the producing the counter substrate, a third electrode, a light-transmitting insulating film, and the second electrodes are stacked on the second light-transmitting base member in the order as listed, and the third electrode overlaps the second electrodes and the slits and has the same potential as that of the second electrodes.

2. The method according to claim 1, wherein at the producing the array substrate and the producing the counter substrate, orientation films in contact with the liquid crystal layer are formed on the first electrodes and the second electrodes, at the curing the liquid crystal layer, the monomers are polymerized to form a mesh-shaped polymer network, and the orientation films are coupled to the polymer network.

* * * * *